(12) United States Patent
Lee et al.

(10) Patent No.: US 7,764,841 B2
(45) Date of Patent: Jul. 27, 2010

(54) MULTI-CODEC TRANSFORMING AND/OR INVERSE TRANSFORMING SYSTEM, MEDIUM, AND METHOD

(75) Inventors: Shihwa Lee, Seoul (KR); Jaesung Park, Suwon-si (KR); Sangjo Lee, Suwon-si (KR); Hyeyun Kim, Seongnam-si (KR); Jihun Kim, Suwon-si (KR); Hyeyeon Chung, Suwon-si (KR); Doohyun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 976 days.

(21) Appl. No.: 11/516,784

(22) Filed: Sep. 7, 2006

(65) Prior Publication Data

US 2007/0053604 A1 Mar. 8, 2007

(30) Foreign Application Priority Data

Sep. 8, 2005 (KR) ........................ 10-2005-0083758

(51) Int. Cl.
*G06K 9/36* (2006.01)

(52) U.S. Cl. ..................................... 382/232

(58) Field of Classification Search ............... 382/232, 382/236, 238, 239, 240, 247, 248, 250, 251; 375/240, 240.12, 240.13, 240.15

See application file for complete search history.

(56) References Cited

U.S. PATENT DOCUMENTS

| 7,092,576 | B2 * | 8/2006 | Srinivasan et al. | 382/238 |
| 7,379,608 | B2 * | 5/2008 | Marpe et al. | 382/247 |
| 7,426,308 | B2 * | 9/2008 | Hsu et al. | 382/239 |
| 7,471,834 | B2 * | 12/2008 | Sull et al. | 382/232 |
| 7,545,988 | B2 * | 6/2009 | Meeker | 382/232 |

* cited by examiner

*Primary Examiner*—Jose L Couso
(74) *Attorney, Agent, or Firm*—Staas & Halsey LLP

(57) ABSTRACT

A transforming and/or inverse transforming system, medium, and method for a multi-codec. The transforming system includes a first matrix storage storing 1-dimensional DCT (discrete cosine transform) matrixes corresponding to respective transformation techniques, a second matrix storage storing 2-dimensional DCT matrixes corresponding to the respective transformation techniques, a 1-dimensional transformer 1-dimensionally transforming an input image using a 1-dimensional DCT matrix corresponding to a set transformation technique, a 2-dimensional transformer 2-dimensionally transforming the 1-dimensionally transformed image using a 2-dimensional DCT matrix corresponding to a set transformation technique, and an enhancement transformer enhancement transforming the 1-dimensionally transformed image to improve efficiency of integer transformation.

60 Claims, 5 Drawing Sheets

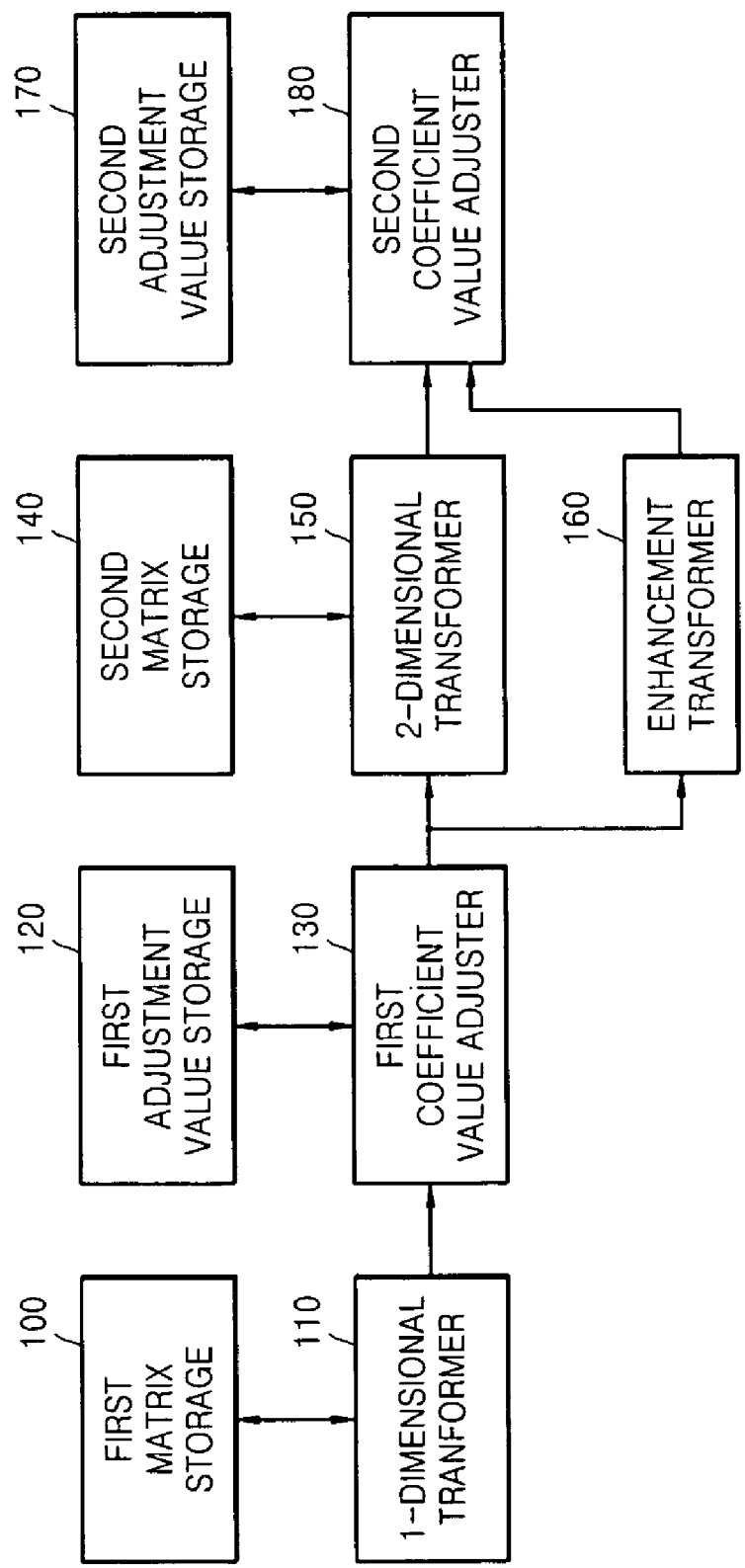

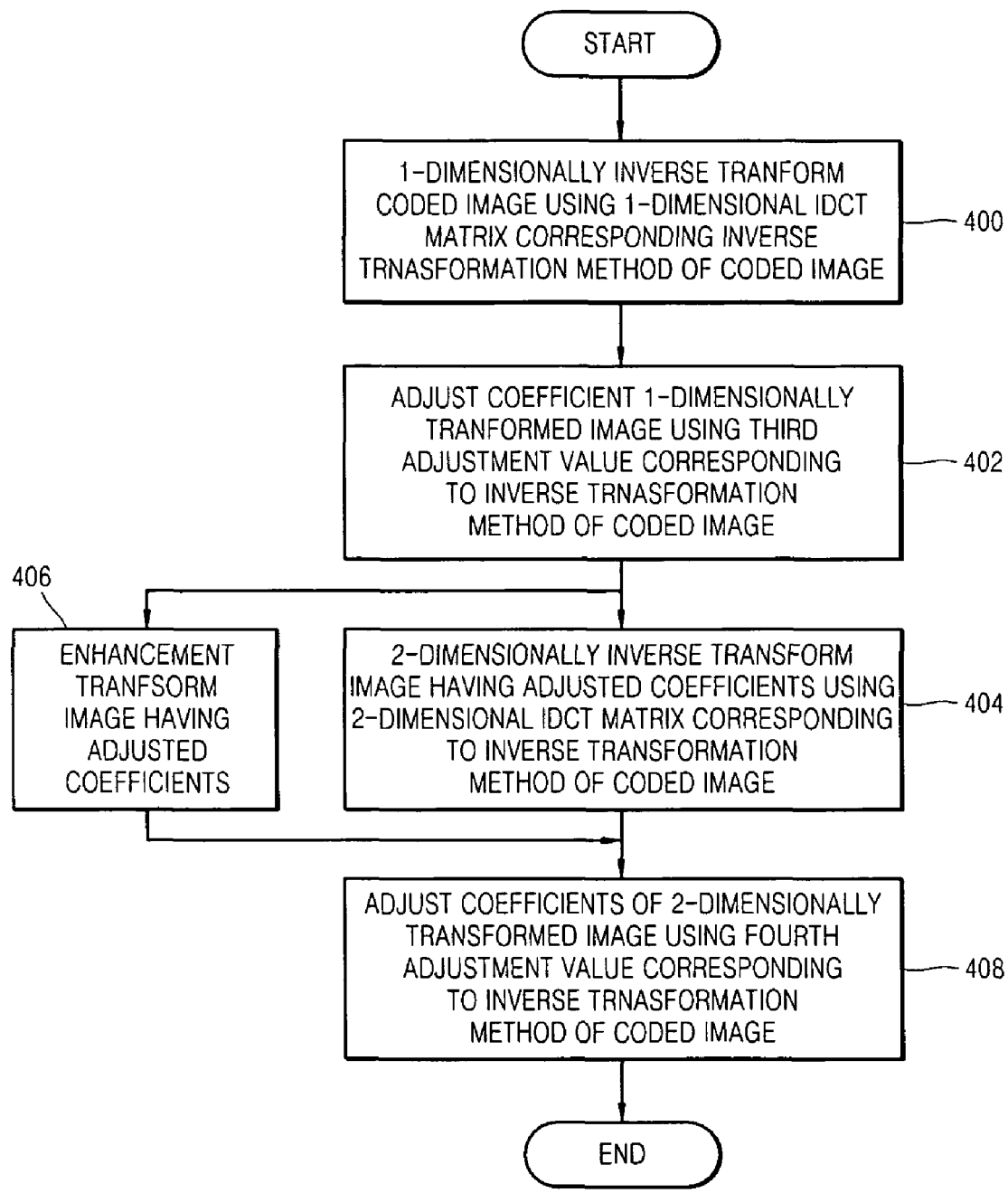

MULTI-CODEC TRANSFORMING AND/OR INVERSE TRANSFORMING SYSTEM, MEDIUM, AND METHOD

CROSS-REFERENCE TO RELATED APPLICATIONS

This application claims the benefit of Korean Patent Application No. 10-2005-0083758, filed on Sep. 8, 2005, in the Korean Intellectual Property Office, the disclosure of which is incorporated herein in its entirety by reference.

BACKGROUND OF THE INVENTION

1. Field of the Invention

An embodiment of the present invention relates to coding and/or decoding of an image, and more particularly, to a multi-codec transforming and/or inverse transforming system, medium, and method by which an image is transformed and/or inverse transformed so as to code and/or decode the image.

2. Description of the Related Art

Conventional image decoding systems may include an entropy decoder, a dequantizer, an inverse transformer, and the like.

A transformer may further be used transform an input image using an orthogonal transformation coding technique, for example. In particular, a transformer may be used to transform the input image using a discrete cosine transform (DCT) in the orthogonal transformation coding technique. In a case where the transformed image has accordingly coded, an inverse transformer may be used to inverse transform the coded image.

However, conventional various codecs, such as moving picture experts group standards (MPEG) format H.264 format and a VC-1 compressed video bitstream format, use different transformation coefficient matrixes.

FIGS. 1A-C illustrate conventional transforming or inverse transforming systems using various transformation techniques, with FIG. 1A illustrating a transforming or inverse transforming system for a MPEG format bitstream, FIG. 1B illustrates a transforming or inverse transforming system for a H.264 format bitstream, and FIG. 1C illustrates a transforming or inverse transforming system for a VC-1 format bitstream.

As shown in FIG. 1A, for transformation or inverse transformation, a MPEG format codec may be implemented with a 1-dimensional transformer 10, a first coefficient value adjuster 12, a 2-dimensional transformer 14, and a second coefficient value adjuster 16. Similarly, as shown in FIG. 1B, for transformation or inverse transformation, a H.264 codec may be implemented with a 1-dimensional transformer 30, a 2-dimensional transformer 32, and a second coefficient value adjuster 34. Further, as shown in FIG. 1C, for transformation or inverse transformation, a VC-1 codec may be implemented with a 1-dimensional transformer 50, a first coefficient value adjuster 52, a 2-dimensional transformer 54, an enhancement transformer, and a second coefficient value adjuster 58.

Such systems that can implement the MPEG format, H.264, and VC-1 codecs independently transform or inverse transform images and thus are not compatible with one another. For example, an image transformed by the MPEG format codec cannot be inverse transformed by the H.264 and VC-1 codecs. To overcome this problem, there have been attempts to integrate the MPEG, H.264, and VC-1 codecs into a multi-codec. However, such a multi-codec includes only selective components of the MPEG format, H.264, and VC-1 codecs. Further, in such a multi-codec, the volume of the multi-codec becomes remarkably increased.

In addition to these drawbacks, a considerable amount of time is required to design the multi-codec, and there are increased related costs for manufacturing the corresponding multi-codec system.

SUMMARY OF THE INVENTION

An embodiment of the present invention provides a multi-codec transforming and/or inverse transforming system, medium and method by which a volume of the multi-codec can be reduced, and images can be transformed using various transformation techniques.

Additional aspects and/or advantages of the invention will be set forth in part in the description which follows and, in part, will be apparent from the description, or may be learned by practice of the invention.

To achieve the above and/or other aspects and advantages, embodiments of the present invention include a multi-codec transforming system for a multi-codec corresponding to a plurality of different codec transformation techniques, including a first matrix storage to store a plurality of 1-dimensional DCT (discrete cosine transform) matrixes corresponding to respective transformation techniques, of the plurality of different codec transformation techniques, a second matrix storage to store a plurality of 2-dimensional DCT matrixes corresponding to the respective transformation techniques, a 1-dimensional transformer to 1-dimensionally transform an input image using a 1-dimensional DCT matrix corresponding to a set transformation technique, selected from among the plurality of 1-dimensional DCT matrixes, a 2-dimensional transformer to 2-dimensionally transform the 1-dimensionally transformed image using a 2-dimensional DCT matrix corresponding to the set transformation technique, selected from among the plurality of 2-dimensional DCT matrixes, and an enhancement transformer to enhancement transform the 1-dimensionally transformed image to improve efficiency of integer transformation.

To achieve the above and/or other aspects and advantages, embodiments of the present invention include a multi-codec inverse transforming system for a multi-codec corresponding to a plurality of different codec transformation techniques, including a first matrix storage to store 1-dimensional IDCT (inverse discrete cosine transform) matrixes corresponding to respective inverse transformation techniques, of the plurality of different codec transformation techniques, a second matrix storage to store 2-dimensional IDCT matrixes corresponding to the respective inverse transformation techniques, 1-dimensional inverse transformer to 1-dimensionally inverse transform a coded image using a 1-dimensional IDCT matrix corresponding to an inverse transformation technique of the coded image, selected from among the plurality of 1-dimensional DCT matrixes, a 2-dimensional inverse transformer to 2-dimensionally inverse transform the 1-dimensionally inverse transformed image using a 2-dimensional IDCT matrix corresponding to the inverse transformation technique of the coded image, selected from among the plurality of 2-dimensional DCT matrixes, and an enhancement inverse transformer to enhancement inverse transform the 1-dimensionally inverse transformed image to improve efficiency of integer inverse transformation.

To achieve the above and/or other aspects and advantages, embodiments of the present invention include a multi-codec transforming method for a multi-codec corresponding to a plurality of different codec transformation techniques, including 1-dimensionally transforming an input image using a 1-dimensional DCT matrix corresponding to a set transformation technique, of the plurality of different codec transformation techniques, selected from among a plurality of 1-dimensional DCT matrixes corresponding to respective transformation techniques, 2-dimensionally transforming the 1-dimensionally transformed image using a 2-dimensional DCT matrix corresponding to the set transformation technique, selected from among a plurality of 2-dimensional DCT matrixes corresponding to the respective transformation techniques, and enhancement transforming the 1-dimensionally transformed image to improve efficiency of integer transformation.

To achieve the above and/or other aspects and advantages, embodiments of the present invention include a multi-codec inverse transforming method for a multi-codec corresponding to a plurality of different codec transformation techniques, including 1-dimensionally inverse transforming a coded image using a 1-dimensional IDCT matrix corresponding to an inverse transformation technique of the coded image, selected from among a plurality of 1-dimensional IDCT matrixes corresponding to respective inverse transformation techniques, 2-dimensionally inverse transforming the 1-dimensionally inverse transformed image using a 2-dimensional IDCT matrix corresponding to the inverse transformation technique of the coded image, selected from among a plurality of 2-dimensional IDCT matrixes corresponding to the respective inverse transformation techniques, and enhancement inverse transforming the 1-dimensionally inverse transformed image to improve efficiency of integer inverse transformation.

To achieve the above and/or other aspects and advantages, embodiments of the present invention may still further include at least one medium including computer readable code to control at least one processing element to implement an embodiment of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 illustrates a transforming system for a multi-codec, according to an embodiment of the present invention;

FIG. 5 illustrates an inverse transforming method for a multi-codec, according to an embodiment of the present invention.

DETAILED DESCRIPTION OF THE PREFERRED EMBODIMENTS

Figure 1A:
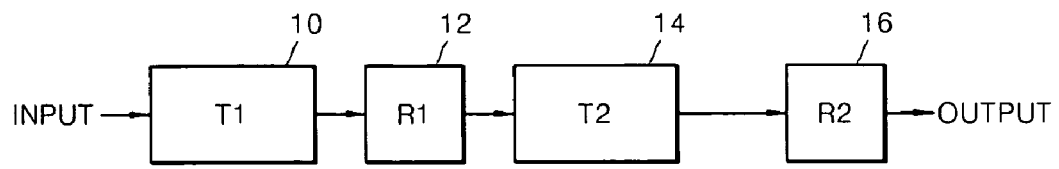
FIGS. 1A through 1C illustrate conventional transforming/inverse transforming systems using various transformation techniques.
Figure 1B:
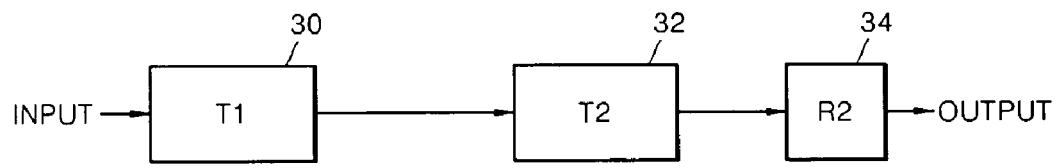
Figure 1C:
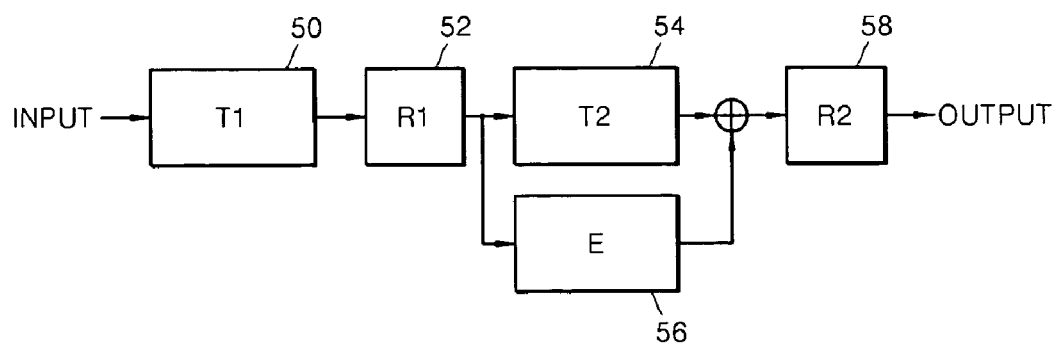

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 2 illustrates a transforming system for a multi-codec, according to an embodiment of the present invention. Referring to FIG. 2, the transforming system may include a first matrix storage 100, a 1-dimensional transformer 110, a first adjustment value storage 120, a first coefficient value adjuster 130, a second matrix storage 140, a 2-dimensional transformer 150, an enhancement transformer 160, a second adjustment value storage 170, and a second coefficient value adjuster 180, for example.

The first matrix storage 100 may store 1-dimensional DCT matrixes respectively corresponding to different, for example, transformation techniques.

The 1-dimensional DCT matrixes may, thus, correspond to MPEG, H.264, and VC-1 transformation techniques, for example, noting that alternate techniques are equally available. Here, as only an example, the 1-dimensional DCT matrixes may include an 8×8 1-dimensional DCT matrix corresponding to the MPEG transformation, a 4×4 1-dimensional DCT matrix corresponding to the H.264 transformation, and 8×8, 4×4, 8×4, and 4×8 1-dimensional DCT matrixes corresponding to the VC-1 transformation.

The first matrix storage 100 may selectively be caused to output a particular 1-dimensional DCT matrix to the 1-dimensional transformer 110, for example, in response to a request of the 1-dimensional transformer 110 for the 1-dimensional DCT matrix.

The 1-dimensional transformer 110 may 1-dimensionally transform an input image using a 1-dimensional DCT matrix corresponding to a set transformation technique and output the transformation result to the first coefficient value adjuster 130, for example. As an example, a user may designate a particular transforming technique for the input image. The 1-dimensional transformer 100 may, thus, request a 1-dimensional DCT matrix corresponding to a pre-set transformation technique, e.g., from the first matrix storage 100, and 1-dimensionally transform the input image using the 1-dimensional DCT matrix provided from the first matrix storage 100.

Accordingly, the 1-dimensional transformer 110 may 1-dimensionally transform the input image into 8×8 blocks.

If the pre-set transformation technique is an MPEG transformation technique, the 1-dimensional transformer 110 may 1-dimensionally transform an input image having an 8×8 block size using the 8×8 1-dimensional DCT matrix corresponding to the MPEG transformation technique.

Similarly, if the pre-set transformation technique is the H.264 transformation technique, the 1-dimensional transformer 110 may 1-dimensionally transform an input image having a 4×4 block size using a combination of 4×4 1-dimensional DCT matrixes corresponding to the H.264 transformation technique. In other words, the 1-dimensional transformer 110 may 1-dimensionally transform an image having a 4×4 block size using Equation 1 below, for example.

$$D_1 = P_{HS} \times T_{HS} \qquad \text{Equation 1:}$$

Here, $D_1$ denotes a matrix of a 1-dimensionally transformed image, $P_{HS}$ denotes a matrix $$P_{HS} = \begin{bmatrix} P_{H1} P_{H2} \\ P_{H3} P_{H4} \end{bmatrix}$$

of a new input image formed of combinations of input images $P_{H1}$, $P_{H2}$, $P_{H3}$, and $P_{H4}$ each having a 4×4 block size, and $T_{HS}$ denotes a new 8×8 1-dimensional DCT matrix $$T_{HS} = \begin{bmatrix} T_{H1} & 0 \\ 0 & T_{H1} \end{bmatrix}$$

formed of combinations of a 1-dimensional DCT matrix $T_{H1}$ corresponding to the H.264 transformation technique. As shown in Equation 1 above, the 1-dimensional transformer 110 may 1-dimensionally transform four input images of 4×4 block size making up the new matrix $$P_{HS} = \begin{bmatrix} P_{H1} P_{H2} \\ P_{H3} P_{H4} \end{bmatrix}$$

having an 8×8 block size using the new 1-dimensional DCT matrix $$T_{HS} = \begin{bmatrix} T_{H1} & 0 \\ 0 & T_{H1} \end{bmatrix}.$$

Thus, the four input images of 4×4 block size may be 1-dimensionally transformed at the same time, for example.

If the pre-set transformation technique is the VC-1 transformation technique, the 1-dimensional transformer 110 may 1-dimensionally transform an input image using combinations of 1-dimensional DCT matrix corresponding to the VC-1 transformation technique.

The 1-dimensional transformer 110 may 1-dimensionally transform the image having the 4×4 block size using Equation 2 below, for example.

$$D_1 = P_{VS1} \times T_{VS1} \qquad \text{Equation 2:}$$

Here, $D_1$ denotes a matrix of a 1-dimensionally transformed image, $P_{VS1}$ denotes a matrix $$P_{VS1} = \begin{bmatrix} P_{V1} P_{V2} \\ P_{V3} P_{V4} \end{bmatrix}$$

of a new input image formed of combinations of images $P_{V1}$, $P_{V2}$, $P_{V3}$, and $P_{V4}$ of 4×4 block size, and $T_{VS1}$ denotes a new 8×8 1-dimensional DCT matrix $$T_{VS1} = \begin{bmatrix} T_{V1} & 0 \\ 0 & T_{V1} \end{bmatrix}$$

formed of combinations of a 4×4 1-dimensional DCT matrix $T_{V1}$ corresponding to the VC-1 transformation technique.

As shown in Equation 2 above, the 1-dimensional transformer 110 may 1-dimensionally transform four input images of 4×4 block size making up the new matrix $$P_{VS1} = \begin{bmatrix} P_{V1} P_{V2} \\ P_{V3} P_{V4} \end{bmatrix}$$

having an 8×8 block size using the new 8×8 1-dimensional DCT matrix $$T_{VS1} = \begin{bmatrix} T_{V1} & 0 \\ 0 & T_{V1} \end{bmatrix}.$$

Thus, the four images having the 4×4 block size may be 1-dimensionally transformed at the same time, for example.

The 1-dimensional transformer 110 may 1-dimensionally transform the image having the 4×8 block size using Equation 3 below, for example.

$$D_1 = P_{VS2} \times T_{VS2} \qquad \text{Equation 3:}$$

Here, $D_1$ denotes a matrix of a 1-dimensionally transformed image, $P_{VS2}$ denotes a matrix $$P_{VS2} = \begin{bmatrix} P_{V5} \\ P_{V6} \end{bmatrix}$$

of a new input image formed of a combination of input images $P_{V5}$ and $P_{V6}$ of 4×8 block size, and $T_{VS2}$ denotes a 8×8 1-dimensional DCT matrix corresponding to the VC-1 transformation technique.

As shown in Equation 3 above, the 1-dimensional transformer 110 may 1-dimensionally transform two input images of 4×8 block size making up the new matrix $$P_{VS2} = \begin{bmatrix} P_{V5} \\ P_{V6} \end{bmatrix}$$

having an 8×8 block size using a 1-dimensional DCT matrix $T_{VS2}$ corresponding to the VC-1 transformation technique. Thus, the two input images having the 4×8 block size may be 1-dimensionally transformed at the same time, for example.

The 1-dimensional transformer 110 may 1-dimensionally transform the image having the 8×4 block size using Equation 4, for example.

$$D_1 = P_{VS3} \times T_{VS3} \qquad \text{Equation 4:}$$

Here, $D_1$ denotes a matrix of a 1-dimensionally transformed image, $P_{VS3}$ denotes a matrix $P_{VS3} = [P_{V7} \ P_{V8}]$ of a new input image formed of a combination of images $P_{V7}$ and $P_{V8}$ of 8×4 block size, and $T_{VS3}$ denotes a new 1-dimensional DCT matrix $$T_{VS3} = \begin{bmatrix} T_{V2} & 0 \\ 0 & T_{V2} \end{bmatrix}$$

formed of a combination of a 1-dimensional DCT matrix $T_{V2}$ of 4×4 block size corresponding to the VC-1 transformation technique. As shown in Equation 4, the 1-dimensional transformer 110 may 1-dimensionally transform two input images of 8×4 block size making up the new matrix $P_{VS3} = [P_{V7} \ P_{V8}]$ of 8×8 block size using the new 8×8 1-dimensional DCT matrix $$T_{VS3} = \begin{bmatrix} T_{V2} & 0 \\ 0 & T_{V2} \end{bmatrix}.$$

Thus, the two images having the 8×4 block size may be 1-dimensionally transformed at the same time, for example.

The first adjustment value storage 120 may store first adjustment values corresponding to the MPEG, H.264, and VC-1 transformation techniques to re-adjust coefficients of the 1-dimensionally transformed image. The first adjustment values mean values set to round 1-dimensionally transformed coefficient values and values set to rescale coefficients. Since the first adjustment values vary depending on the MPEG, H.264, and VC-1 transformation techniques, the first adjustment value storage 120 may separately store the first adjustment values varying with the MPEG, H.264, and VC-1 transformation techniques, for example.

For example, if the first coefficient value adjuster 130 requests a first adjustment value corresponding to a set transformation technique, e.g., from the first adjustment value storage 120, the first adjustment value storage 120 may output the first adjustment value to the first coefficient adjuster 130.

The first coefficient value adjuster 130 may adjust coefficients of the 1-dimensionally transformed image using the first adjustment value corresponding to the set transformation technique and output the adjustment results to the 2-dimensional transformer 150 and the enhancement transformer 160.

For example, if the set transformation technique is the H.264 transformation technique, the first coefficient value adjuster 130 may read a first adjustment value corresponding to the H.264 transformation technique from the first adjustment value storage 120 and adjust the coefficient values of the 1-dimensionally transformed image using the read first adjustment value.

The second matrix storage 140 may store 2-dimensional DCT matrixes corresponding to the respective transformation techniques. The second matrix storage 140 may store matrixes corresponding to the MPEG, H.264, and VC-1 transformation techniques as the 2-dimensional DCT matrixes. In other words, the second matrix storage 140 may store an 8×8 2-dimensional DCT matrix corresponding to the MPEG transformation technique, a 4×4 2-dimensional DCT matrix corresponding to the H.264 transformation technique, and 8×8, 4×4, 8×4, and 4×8 2-dimensional DCT matrixes corresponding to the VC-1 transformation technique, for example, noting that additional transforming techniques are equally available.

The second matrix storage 140 may be controlled to output a 2-dimensional DCT matrix to the 2-dimensional transformer 150, e.g., in response to a request from the 2-dimensional transformer 150, for the 2-dimensional DCT matrix.

The 2-dimensional transformer 150 may 2-dimensionally transform the 1-dimensionally transformed image using the 2-dimensional DCT matrix corresponding to the pre-set transformation technique and output the transformation result to the second coefficient value adjuster 180, for example. The 2-dimensional transformer 150 may request the 2-dimensional DCT matrix corresponding to the pre-set transformation technique, e.g., from the second matrix storage 140, and 2-dimensionally transform the 1-dimensionally transformed image using the 2-dimensional DCT matrix, e.g., provided from the second matrix storage 140.

If the preset transformation technique is a MPEG transformation technique, the 2-dimensional transformer 150 may 2-dimensionally transform the 1-dimensionally transformed image using an 8×8 2-dimensional DCT matrix corresponding to the MPEG transformation technique.

If the pre-set transformation technique is the H.264 transformation technique, the second transformer 150 may 2-dimensionally transform the 1-dimensionally transformed image using a combination of 4×4 2-dimensional DCT matrixes corresponding to the H.264 transformation technique. In other words, the 2-dimensional transformer 150 may 2-dimensionally transform the 1-dimensionally transformed image using Equation 5 below, for example.

$$D_2 = D_1^T \times T_{HS}$$  Equation 5:

Here, $D_2$ denotes a matrix of the 2-dimensionally transformed image, $D_1^T$ denotes a transposed matrix of $D_1$, and $T_{HS}$ is the same as $T_{HS}$ of the determinant 1. As shown in Equation 5, the 2-dimensional transformer 150 makes up the transposed matrix $D_1^T$ of the matrix $D_1$ of the 1-dimensionally transformed image and 2-dimensionally transforms the 1-dimensionally transformed image using an 8×8 2-dimensional DCT matrix $$T_{HS} = \begin{bmatrix} T_{H1} & 0 \\ 0 & T_{H1} \end{bmatrix}.$$

If the preset transformation technique is the VC-1 transformation technique, the 2-dimensional transformer 150 may 2-dimensionally transform the 1-dimensionally transformed image using a combination of 2-dimensional DCT matrixes corresponding to the VC-1 transformation technique.

The 2-dimensional transformer 150 may 2-dimensionally transform the image 1-dimensionally transformed by Equation 2 above using the below Equation 6, for example.

$$D_2 = D_1^T \times T_{VS4}$$  Equation 6:

Here, $D_2$ denotes a matrix of the 2-dimensionally transformed image, $D_1^T$ denotes a transposed matrix of $D_1$, and $T_{VS4}$ denotes a new 8×8 2-dimensional DCT matrix $$T_{VS4} = \begin{bmatrix} T_{V3} & 0 \\ 0 & T_{V3} \end{bmatrix}$$

formed of a combination of a 4×4 2-dimensional DCT matrix $T_{V3}$ corresponding to the VC-1 transformation technique. As shown in Equation 6 above, the 2-dimensional transformer 150 makes up the transposed matrix $D_1^T$ of the matrix $D_1$ of the 1-dimensionally transformed image and 2-dimensionally transforms the 1-dimensionally transformed image using the new 8×8 2-dimensional DCT matrix $$T_{VS4} = \begin{bmatrix} T_{V3} & 0 \\ 0 & T_{V3} \end{bmatrix}.$$

The 2-dimensional transformer 150 may 2-dimensionally transform the image 1-dimensionally transformed by Equation 3 using Equation 7 below, for example.

$$D_2 = D_1^T \times T_{VS5}$$  Equation 7:

Here, $D_2$ denotes a matrix of the 2-dimensionally transformed image, $D_1^T$ denotes a transposed matrix of $D_1$, and $T_{VS5}$ denotes a new 2-dimensional DCT matrix $$T_{VS5} = \begin{bmatrix} T_{V4} & 0 \\ 0 & T_{V4} \end{bmatrix}$$

formed of a combination of a 2-dimensional DCT matrix $T_{V4}$ of 4×4 block size corresponding to the VC-1 transformation technique. As shown in Equation 7, the 2-dimensional transformer 150 makes up a transposed matrix $D_1^T$ of the matrix $D_1$ of the 1-dimensionally transformed image and 2-dimen sionally transforms the 1-dimensionally transformed image using the new 8×8 2-dimensional DCT matrix $$T_{VS5} = \begin{bmatrix} T_{V4} & 0 \\ 0 & T_{V4} \end{bmatrix}$$

The 2-dimensional transformer 150 may 2-dimensionally transform the image 1-dimensionally transformed by the Equation 4 using Equation 8 below, for example.

$$D_2 = D_1^T \times T_{VS6} \qquad \text{Equation 8:}$$

Here, $D_2$ denotes a matrix of the 2-dimensionally transformed image, $D_1^T$ denotes a transposed matrix of $D_1$, and $T_{VS6}$ denotes a 2-dimensional DCT matrix of 8×8 block size corresponding to the VC-1 transformation technique. As shown in Equation 8, the 2-dimensional transformer 150 makes up the transposed matrix $D_1^T$ of the matrix $D_1$ of the 1-dimensionally transformed image and 2-dimensionally transforms the 1-dimensionally transformed image using the 8×8 2-dimensional DCT matrix $T_{VS6}$.

The enhancement transformer 160 may enhancement transform the 1-dimensionally transformed image to improve efficiency of integer transformation and output the enhancement transformation result to the second coefficient value adjuster 180, for example.

Here, enhancement transformation means that a coefficient value of an image adjusted by the first coefficient value adjuster 130 is correction transformed.

The second adjustment value storage 170 may store second adjustment values corresponding to respective transformation techniques to re-adjust coefficients of the 2-dimensionally transformed image. The second adjustment values are values set to round 2-dimensionally transformed coefficients and values set to rescale coefficients. Since the second set values vary depending on the example MPEG, H.264, and VC-1 transformation techniques, the second adjustment value storage 170 may store second adjustment values varying with transformation techniques.

Thus, the second adjustment value storage 170 may store second adjustment values varying with the MPEG, H.264, and VC-1 transformation techniques. Also, if the second coefficient value adjuster 180 requests a second adjustment value corresponding to a set transformation technique, e.g., from the second adjustment value storage 170, the second adjustment value storage 170 may output the second adjustment value to the second coefficient value adjuster 180.

The second coefficient value adjuster 180 may adjust coefficients of the 2-dimensionally transformed image using the second adjustment value corresponding to the set transformation technique. For example, if the set transformation technique is the H.264 transformation technique, the second coefficient value adjuster 180 may read a second adjustment value corresponding to the H.264 transformation technique from the second adjustment value storage 170 and adjust the coefficients of the 2-dimensionally transformed image using the read second adjustment value.

In particular, the second coefficient value adjuster 180 reflects the enhancement transformation result of the enhancement transformer 160 on the coefficients of the 2-dimensionally transformed image and then adjusts the coefficients of the 2-dimensionally transformed image using the second adjustment value corresponding to the set transformation technique.

Figure 3:
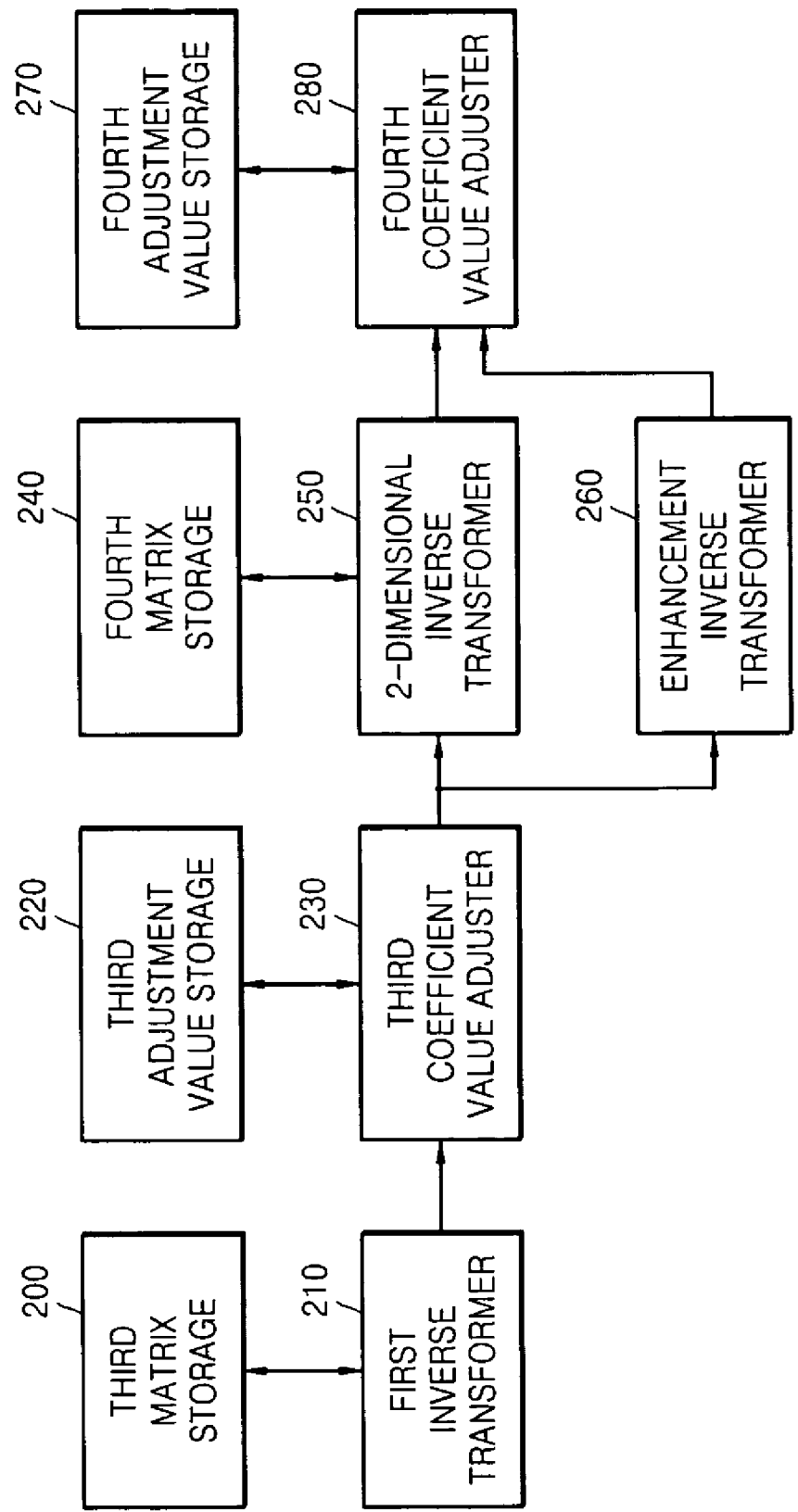
FIG. 3 illustrates an inverse transforming system for a multi-codec, according to an embodiment of the present invention.

FIG. 3 illustrates an inverse transforming system used for a multi-codec, according to an embodiment of the present invention. Referring to FIG. 3, the inverse transforming system may include a third matrix storage 200, a 1-dimensional inverse transformer 210, a third adjustment value storage 220, a third coefficient value adjuster 230, a fourth matrix storage 240, a 2-dimensional inverse transformer 250, an enhancement inverse transformer 260, a fourth adjustment value storage 270, and a fourth coefficient value adjuster 280, for example.

The third matrix storage 200 may store 1-dimensional inverse DCT (IDCT) matrixes corresponding to respective inverse transformation techniques.

For example, the third matrix storage 200 may store matrixes corresponding to MPEG, H.264, and VC-1 inverse transformation techniques as the 1-dimensional IDCT matrixes. In other words, the third matrix storage 200 may store an 8×8 1-dimensional IDCT matrix corresponding to the MPEG inverse transformation technique, a 4×4 1-dimensional IDCT matrix corresponding to the H.264 inverse transformation technique, and 8×8, 4×4, 8×4, and 4×8 1-dimensional IDCT matrixes corresponding to the VC-1 inverse transformation technique, for example.

The third matrix storage 200 may output a 1-dimensional IDCT matrix to the 1-dimensional inverse transformer 210, e.g., in response to a request of the 1-dimensional inverse transformer 210, for the 1-dimensional IDCT matrix.

The 1-dimensional inverse transformer 210 may 1-dimensionally inverse transform a coded image using a 1-dimensional IDCT matrix corresponding to an inverse transformation technique of the coded image and output the inverse transformation result to the third coefficient value adjuster 230. The 1-dimensional inverse transformer 210 may request the 1-dimensional IDCT matrix corresponding to the inverse transformation technique of the coded image of the third matrix storage 200 and 1-dimensionally inverse transform the coded image using the 1-dimensional IDCT matrix provided from the third matrix storage 200.

Thus, the 1-dimensional inverse transformer 210 may 1-dimensionally inverse transform an input image in the unit of 8×8 block size.

If the inverse transformation technique of the coded image is the MPEG inverse transformation technique, the 1-dimensional inverse transformer 210 may 1-dimensionally inverse transform a coded image of 8×8 block size using an 8×8 1-dimensional IDCT matrix corresponding to the MPEG inverse transformation technique.

If the inverse transformation technique of the coded image is the H.264 inverse transformation technique, the 1-dimensional inverse transformer 210 may 1-dimensionally inverse transform a coded image of 4×4 block size using a combination of 4×4 1-dimensional IDCT matrixes corresponding to the H.264 inverse transformation technique. In other words, the 1-dimensional inverse transformer 210 may 1-dimensionally inverse transform an image of 4×4 block size using Equation 9 below, for example.

$$D_{I1} = P_{IHS} \times T_{IHS} \qquad \text{Equation 9:}$$

Here, $D_{I1}$ denotes a matrix of the 1-dimensionally inverse transformed image, $P_{IHS}$ denotes a matrix $$P_{IHS} = \begin{bmatrix} P_{IH1} & P_{IH2} \\ P_{IH3} & P_{IH4} \end{bmatrix}$$

of a new coded image formed of a combination of coded images $P_{IH1}$, $P_{IH2}$, $P_{IH3}$, and $P_{IH4}$ of 4×4 block size, and $T_{IHS}$ denotes a new 8×8 1-dimensional IDCT matrix $$T_{IHS} = \begin{bmatrix} T_{IH1} & 0 \\ 0 & T_{IH1} \end{bmatrix}$$

formed of a combination of a 4×4 1-dimensional IDCT matrix $T_{IH1}$ corresponding to the H.264 inverse transformation technique. As shown in Equation 9, the 1-dimensional inverse transformer 210 may 1-dimensionally inverse transform four coded images of 4×4 block size making up the new matrix $$P_{IHS} = \begin{bmatrix} P_{IH1} & P_{IH2} \\ P_{IH3} & P_{IH4} \end{bmatrix}$$

of 8×8 block size using the new 8×8 1-dimensional IDCT matrix $$T_{IHS} = \begin{bmatrix} T_{IH1} & 0 \\ 0 & T_{IH1} \end{bmatrix}.$$

Thus, the four coded images of 4×4 block size may be 1-dimensionally inverse transformed at the same time, for example.

If the inverse transformation technique of the coded image is the VC-1 inverse transformation technique, the 1-dimensional inverse transformer 210 may 1-dimensionally inverse transform the coded image using a combination of 1-dimensional IDCT matrixes corresponding to the VC-1 inverse transformation technique.

The 1-dimensional inverse transformer 210 may 1-dimensionally inverse transform an image of block size 4×4 using Equation 10 below, for example.

$$D_{I1} = P_{IVS1} \times T_{IVS1} \quad \text{Equation 10:}$$

Here, $D_{I1}$, denotes a matrix of the 1-dimensionally transformed image, $P_{IVS1}$ denotes a matrix $$P_{IVS1} = \begin{bmatrix} P_{IV1} & P_{IV2} \\ P_{IV3} & P_{IV4} \end{bmatrix}$$

of a new coded image formed of a combination of coded images $P_{IV1}$, $P_{IV2}$, $P_{IV3}$, and $P_{IV4}$ of 4×4 block size, and $T_{IVS1}$, denotes a new 8×8 1-dimensional IDCT matrix $$T_{IVS1} = \begin{bmatrix} T_{IV1} & 0 \\ 0 & T_{IV1} \end{bmatrix}$$

formed of a combination of a 1-dimensional IDCT matrix $T_{IV1}$ corresponding to the VC-1 inverse transformation technique. As shown in Equation 10, the 1-dimensional inverse transformer 210 may 1-dimensionally inverse transform four coded images of 4×4 block size making up the new matrix $$P_{IVS1} = \begin{bmatrix} P_{IV1} & P_{IV2} \\ P_{IV3} & P_{IV4} \end{bmatrix}$$

of 8×8 block size using the new 8×8 1-dimensional IDCT matrix $$T_{IVS1} = \begin{bmatrix} T_{IV1} & 0 \\ 0 & T_{IV1} \end{bmatrix}.$$

Thus, the four coded images of 4×4 block size may be 1-dimensionally inverse transformed at the same time, for example.

The 1-dimensional inverse transformer 210 may 1-dimensionally inverse transform an image of 4×8 block size using Equation 11 below, for example.

$$D_{I1} = P_{IVS2} \times T_{IVS2} \quad \text{Equation 11:}$$

Here, $D_{I1}$ denotes a matrix of the 1-dimensionally inverse transformed image, $P_{IVS2}$ denotes a matrix $$P_{IVS2} = \begin{bmatrix} P_{IV5} \\ P_{IV6} \end{bmatrix}$$

of a new coded image formed of a combination of coded images $P_{IV5}$ and $P_{IV6}$ of 4×8 block size, and $T_{IVS2}$ denotes an 8×8 1-dimensional IDCT matrix corresponding to the VC-1 inverse transformation technique. As shown in Equation 11, the 1-dimensional inverse transformer 210 may 1-dimensionally inverse transform two coded images of 4×8 block size making up the new matrix $$P_{IVS2} = \begin{bmatrix} P_{IV5} \\ P_{IV6} \end{bmatrix}$$

of 8×8 block size using the 8×8 1-dimensional IDCT matrix $T_{IVS2}$ corresponding to the VC-1 inverse transformation technique. Thus, the two images of 4×8 block size may be 1-dimensionally inverse transformed at the same time, for example.

The 1-dimensional inverse transformer 210 may 1-dimensionally inverse transform an image of 8×4 block size using Equation 12 below, for example.

$$D_{I1} = P_{IVS3} \times T_{IVS3} \quad \text{Equation 12}$$

Here, $D_{I1}$, denotes a matrix of the 1-dimensionally inverse transformed image, $P_{IVS3}$ denotes a matrix $P_{IVS3} = [P_{IV7} \; P_{IV8}]$ of a new coded image formed of a combination of coded images $P_{IV7}$ and $P_{IV8}$ of 8×4 block size, and $T_{IVS3}$ denotes a new 1-dimensional IDCT matrix $$T_{IV3} = \begin{bmatrix} T_{IV2} & 0 \\ 0 & T_{IV2} \end{bmatrix}$$

formed of a 1-dimensional IDCT matrix $T_{IV2}$ of 4×4 block size corresponding to the VC-1 inverse transformation technique. As shown in Equation 12, the 1-dimensional inverse transformer 210 may 1-dimensionally inverse transform two coded images of 8×4 block size making up the new matrix $P_{IVS3}=[P_{IV7}\ P_{IV8}]$ of 8×8 block size using the new 8×8 1-dimensional IDCT matrix $$T_{IV3} = \begin{bmatrix} T_{IV2} & 0 \\ 0 & T_{IV2} \end{bmatrix}.$$

Thus, two images of 8×4 block size may be 1-dimensionally inverse transformed at the same time, for example.

The third adjustment value storage 220 may store third adjustment values corresponding to respective inverse transformation techniques to re-adjust coefficients of the 1-dimensionally inverse transformed image. The third adjustment values are values set to round the coefficients of the 1-dimensionally inverse transformed image and values set to rescale the coefficients. Since the third set values vary depending on the example MPEG, H.264, and VC-1 inverse transformation techniques, the third adjustment value storage 220 may store third adjustment values varying with inverse transformation techniques.

Thus, according to an embodiment of the present invention, the third adjustment value storage 220 stores third adjustment values that vary with the MPEG, H.264, and VC-1 inverse transformation techniques. Thereafter, if the third coefficient value adjuster 230, for example, requests a third adjustment value corresponding to an inverse transformation technique of the coded image of the third adjustment value storage 220, the third adjustment value storage 220 may output the third adjustment value to the third coefficient value adjuster 230.

The third coefficient value adjuster 230 may adjust the coefficients of the 1-dimensionally inverse transformed image using the third adjustment value, for example, corresponding to the inverse transformation technique of the coded image and the adjustment results to the 2-dimensional inverse transformer 250 and the enhancement inverse transformer 260, for example.

As only an example, if the inverse transformation technique is the H.264 inverse transformation technique, the third coefficient value adjuster 230 may read a third adjustment value corresponding to the H.264 inverse transformation technique from the third adjustment value storage 220, for example, and adjust the coefficients of the 1-dimensionally inverse transformed image using the read third adjustment value.

The fourth matrix storage 240 may store 2-dimensional IDCT matrixes corresponding to respective inverse transformation techniques.

The fourth matrix storage 240 may store matrixes corresponding to the MPEG, H.264, and VC-1 inverse transformation techniques, for example, as the 2-dimensional IDCT matrixes. In other words, the fourth matrix storage 240 may store an 8×8 2-dimensional IDCT matrix corresponding to the MPEG inverse transformation technique, a 4×4 2-dimensional IDCT matrix corresponding to the H.264 inverse transformation technique, and 8×8, 4×4, 8×4, and 4×8 2-dimensional IDCT matrixes corresponding to the VC-1 inverse transformation technique.

The fourth matrix storage 240 may output a 2-dimensional IDCT matrix to the 2-dimensional inverse transformer 250, for example, in response to a request of the 2-dimensional inverse transformer 250 for the 2-dimensional IDCT matrix.

The 2-dimensional inverse transformer 250 may 2-dimensionally inverse transform the 1-dimensionally inverse transformed image using the 2-dimensional IDCT matrix corresponding to the inverse transformation technique of the coded image and output the inverse transformation result to the fourth coefficient value adjuster 280, for example. The 2-dimensional inverse transformer 250 may, thus, request the 2-dimensional IDCT matrix corresponding to the inverse transformation technique of the coded image of the fourth matrix storage 240, for example, and 2-dimensionally inverse transform the 1-dimensionally inverse transformed image using the 2-dimensional IDCT matrix provided from the fourth matrix storage 240.

If the inverse transformation technique of the coded image is the MPEG inverse transformation technique, the 2-dimensional inverse transformer 250 may 2-dimensionally inverse transform the 1-dimensionally inverse transformed image using an 8×8 2-dimensional IDCT matrix corresponding to the MPEG inverse transformation technique, for example.

If the inverse transformation technique of the coded image is the H.264 inverse transformation technique, the 2-dimensional inverse transformer 250 may 2-dimensionally inverse transform the 1-dimensionally transformed image using a combination of 4×4 2-dimensional IDCT matrixes corresponding to the H.264 inverse transformation technique, for example. In other words, the 2-dimensional inverse transformer 250 may 2-dimensionally inverse transform the 1-dimensionally transformed image using Equation 13 below.

$$D_{I2}=D_{I1}^{T} \times T_{IHS} \qquad \text{Equation 13:}$$

Here, $D_{I2}$ denotes a matrix of the 2-dimensionally inverse transformed image, and $D_{I1}^{T}$ denotes a transposed matrix of $D_{I1}$. As shown in Equation 13, the 2-dimensional inverse transformer 250 makes up a transposed matrix $D_1^T$ of the matrix $D_1$ of the 1-dimensionally inverse transformed image and 2-dimensionally inverse transforms the 1-dimensionally inverse transformed image using an 8×8 2-dimensional IDCT matrix.

If the inverse transformation technique of the coded image is the VC-1 inverse transformation technique, the 2-dimensional inverse transformer 250 may 2-dimensionally inverse transform the 1-dimensionally inverse transformed image using a combination of 2-dimensional IDCT matrixes corresponding to the VC-1 inverse transformation technique, for example.

The 2-dimensional inverse transformer 250 may 2-dimensionally inverse transform the image 1-dimensionally inverse transformed by Equation 10 using Equation 14 below, for example.

$$D_{I2}=D_{I1}^{T} \times T_{IVS4}$$

Here, $D_{I2}$ denotes a matrix of the 2-dimensionally inverse transformed image, $D_{I1}^{T}$ denotes a transposed matrix of $D_{I1}$, and $T_{IVS4}$ denotes a new 8×8 2-dimensional IDCT matrix $$T_{IV4} = \begin{bmatrix} T_{IV3} & 0 \\ 0 & T_{IV3} \end{bmatrix}$$

formed of a combination of a 4×4 2-dimensional IDCT matrix $T_{IV3}$ corresponding to the VC-1 inverse transformation technique. As shown in Equation 14, the 2-dimensional inverse transformer 250 makes up a transposed matrix $D_1^T$ of the matrix $D_1$ of the 1-dimensionally transformed image and 2-dimensionally inverse transforms the 1-dimensionally inverse transformed image using the new 8×8 2-dimensional IDCT matrix $$T_{IVS4} = \begin{bmatrix} T_{IV3} & 0 \\ 0 & T_{IV3} \end{bmatrix}.$$

The 2-dimensional inverse transformer 250 may 2-dimensionally inverse transform the image 1-dimensionally inverse transformed by Equation 11 using Equation 15 below, for example.

$$D_{I2} = D_{I1}{}^T \times T_{IVS5}$$

Here, $D_{I2}$ denotes a matrix of the 2-dimensionally inverse transformed image, $D_{I1}{}^T$ denotes a transposed matrix of $D_{I1}$, and $T_{IVS5}$ denotes a new 2-dimensional IDCT matrix $$T_{IVS5} = \begin{bmatrix} T_{IV4} & 0 \\ 0 & T_{IV4} \end{bmatrix}$$

formed of a combination of a 2-dimensional IDCT matrix $T_{IV4}$ of 4×4 block size corresponding to the VC-2 inverse transformation technique. As shown in Equation 15, the 2-dimensional inverse transformer 250 makes up the transposed matrix $D_1{}^T$ of the matrix $D_1$ of the 1-dimensionally inverse transformed image and 2-dimensionally inverse transforms the 1-dimensionally transformed image using the new 8×8 2-dimensional IDCT matrix $$T_{IVS5} = \begin{bmatrix} T_{IV4} & 0 \\ 0 & T_{IV4} \end{bmatrix}.$$

The 2-dimensional inverse transformer 250 may also 2-dimensionally inverse transform the image 1-dimensionally transformed by Equation 12 using Equation 16 below, for example.

$$D_{I2} = D_{I1}{}^T \times T_{IVS6}$$

Here, $D_{I2}$ denotes a matrix of the 2-dimensionally transformed image, $D_{I1}{}^T$ denotes a transposed matrix of $D_{I1}$, and $T_{IVS6}$ denotes a 2-dimensional IDCT matrix of 8×8 block size corresponding to the VC-1 inverse transformation technique. As shown in Equation 16, the 2-dimensional inverse transformer 250 makes up a transposed matrix $D_1{}^T$ of the matrix $D_1$ of the 1-dimensionally transformed image and 2-dimensionally inverse transforms the 1-dimensionally inverse transformed image using an 8×8 2-dimensional IDCT matrix $T_{IVS6}$.

The enhancement inverse transformer 260 may enhancement inverse transform the 1-dimensionally inverse transformed image to improve efficiency of integer inverse transformation and the inverse transformation result to the fourth coefficient value adjuster 280, for example.

Here, the enhancement inverse transformation means a correction inverse transformation of a coefficient value of an image adjusted by the third coefficient value adjuster 230.

The fourth adjustment value storage 270 may store fourth adjustment values corresponding to the respective inverse transformation techniques to re-adjust coefficients of the 2-dimensionally inverse transformed image, for example. The fourth adjustment values are values set to round the coefficients of the 2-dimensionally inverse transformed image and values set to rescale the coefficients. Since the fourth set values vary depending on the example MPEG, H.264, and VC-1 inverse transformation techniques, the fourth adjustment value storage 270 may store fourth adjustment values varying with inverse transformation techniques.

Thus, in an embodiment, the fourth adjustment value storage 270 stores fourth adjustment values varying with the MPEG, H.264, and VC-1 inverse transformation techniques. If the fourth coefficient value adjuster 280, for example, requests a fourth adjustment value corresponding to the inverse transformation technique of the coded image, the fourth adjustment value storage 270, for example, may output the fourth adjustment value to the fourth coefficient value adjuster 280.

The fourth coefficient value adjuster 280 may adjust coefficients of the 2-dimensionally inverse transformed image using the fourth adjustment value corresponding to the inverse transformation technique of the coded image. For example, if the inverse transformation technique of the coded image is the H.264 inverse transformation technique, the fourth coefficient value adjuster 280 may read a fourth adjustment value corresponding to the H.264 inverse transformation technique from the fourth adjustment value storage 270 and adjust the coefficients of the 2-dimensionally inverse transformed image using the read fourth adjustment value.

In particular, the fourth coefficient value adjuster 280 reflects the enhancement inverse transformation result of the enhancement inverse transformer 260 on the coefficients of the 2-dimensionally inverse transformed image and adjusts the coefficients of the 2-dimensionally inverse transformed image using the fourth adjustment value corresponding to the inverse transformation technique of the coded image.

Figure 4:
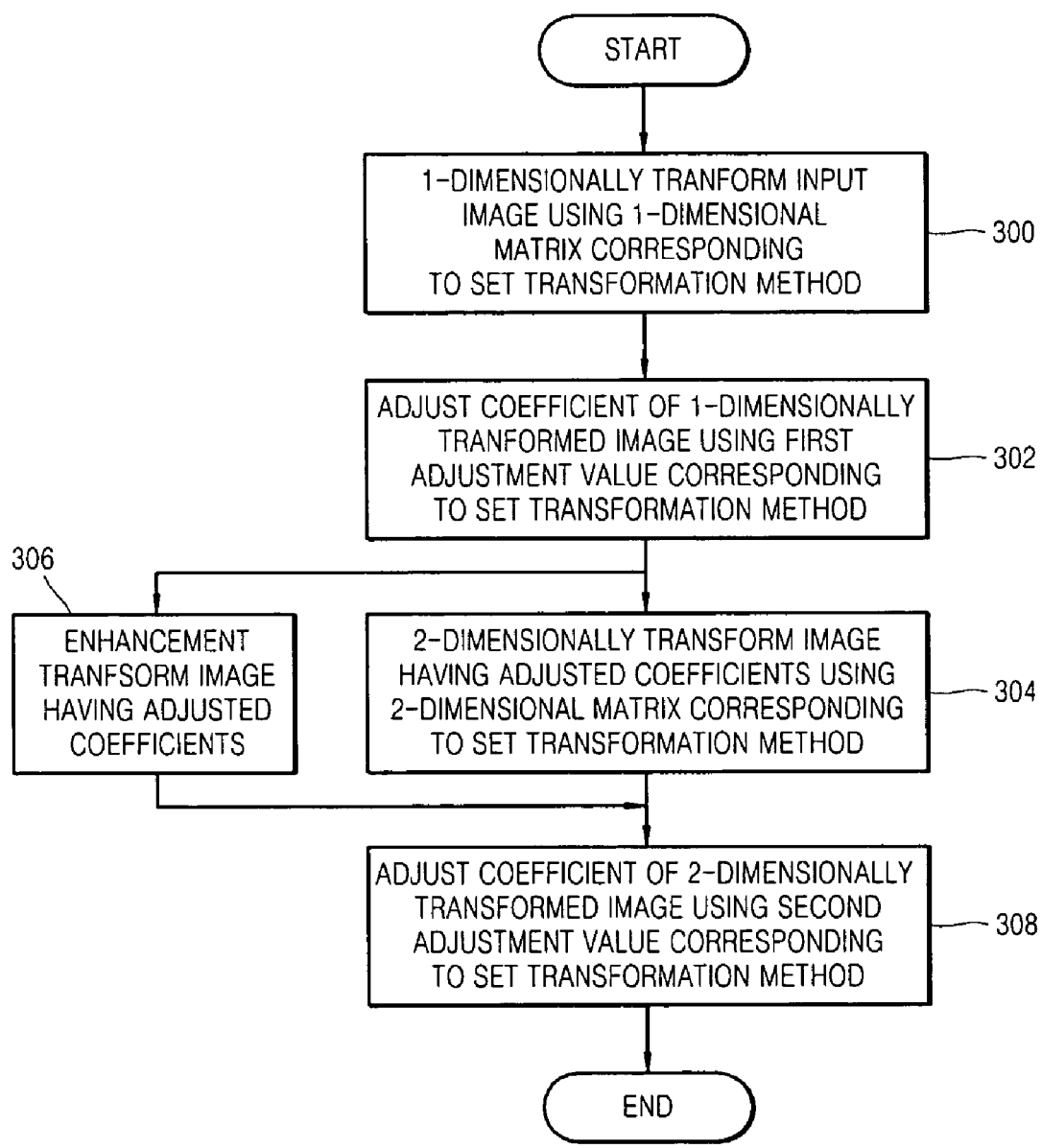
FIG. 4 illustrates a transforming method for a multi-codec, according to an embodiment of the present invention.

FIG. 4 illustrates a transforming method used for a multi-codec, according to an embodiment of the present invention.

In operation S300, an input image may be 1-dimensionally transformed using a 1-dimensional DCT matrix of 1-dimensional DCT matrixes corresponding to a set transformation technique, with the 1-dimensional DCT matrixes corresponding to respective transformation techniques.

Here, in one embodiment, the 1-dimensional DCT matrixes are matrixes corresponding to MPEG, H.264, and VC-1 transformation techniques.

In operation S300, the input image may be 1-dimensionally transformed in the unit of 8×8 block size.

If the set transformation technique is the MPEG transformation technique, an input image of 8×8 block size may be 1-dimensionally transformed using an 8×8 1-dimensional DCT matrix corresponding to the MPEG transformation technique, in operation S300.

If the set transformation technique is the H.264 transformation technique, an image of 4×4 block size may be 1-dimensionally transformed using the above Equation 1, in operation S300. Thus, here, fourth images of 4×4 block size may be 1-dimensionally transformed at the same time, for example.

If the set transformation technique is the VC-1 transformation technique, an input image may be 1-dimensionally transformed using a combination of 1-dimensional DCT matrixes corresponding to the VC-1 transformation technique, in operation S300. Here, an image of 4×4 block size may be 1-dimensionally transformed using Equation 2, in operation S300. Thus four images of 4×4 block size may be 1-dimensionally transformed at the same time, for example.

An image of 4×8 block size may similarly be 1-dimensionally transformed using Equation 3 in operation S300, such that two images of 4×8 block size are 1-dimensionally transformed at the same time, for example.

An image of 8×4 block size may also be 1-dimensionally transformed using Equation 4 in operation S300, such that two images of 8×4 block size are 1-dimensionally transformed at the same time, also as an example.

After operation S300, coefficients of the 1-dimensionally transformed image may be adjusted using a first adjustment value of 1-dimensional adjustment values corresponding to a set transformation technique, in operation S302, with the 1-dimensional adjustment values being for re-adjusting the coefficients of the 1-dimensionally transformed image. For example, if the set transformation technique is the H.264 transformation technique, the coefficients of the 1-dimensionally transformed image may be adjusted using a first adjustment value corresponding to the H.264 transformation technique.

After operation S302, the 1-dimensionally transformed image may be 2-dimensionally transformed using a 2-dimensional DCT matrix of 2-dimensional DCT matrixes corresponding to the set transformation technique, in operation S304, with the 2-dimensional DCT matrixes corresponding to the respective transformation techniques.

Here, according to one embodiment, the 2-dimensional DCT matrixes are matrixes corresponding to the MPEG, H.264, and VC-1 transformation techniques.

If the set transformation technique is the MPEG transformation technique, the 1-dimensionally transformed image may be 2-dimensionally transformed using an 8×82-dimensional DCT matrix corresponding to the MPEG transformation technique, in operation S304.

If the set transformation technique is the H.264 transformation technique, the 1-dimensionally transformed image may be 2-dimensionally transformed using a combination of 4×4 2-dimensional DCT matrixes corresponding to the H.264 transformation technique, in operation S304. In other words, the 1-dimensionally transformed image may be 2-dimensionally transformed using Equation 5 in operation S304.

If the set transformation technique is the VC-1 transformation technique, the 1-dimensionally transformed image may be 2-dimensionally transformed using a combination of 2-dimensional DCT matrixes corresponding to the VC-1 transformation technique, in operation S304.

The image 1-dimensionally transformed by Equation 2 may be 2-dimensionally transformed using Equation 6, in operation S304.

Similarly, the image 1-dimensionally transformed by Equation 3 may be 2-dimensionally transformed using Equation 7, in operation S304.

The image 1-dimensionally transformed by Equation 4 may likewise be 2-dimensionally transformed using Equation 8, in operation S304.

After operation S304, the 1-dimensionally transformed image may be enhancement transformed to improve efficiency of integer transformation, in operation S306. Here, the enhancement transformation means correction transformation of a coefficient value of an image adjusted in operation S302.

After operations S304 and 306, coefficients of the 2-dimensionally transformed image may be adjusted using a second adjustment value of second adjustment values corresponding to a set transformation technique, in operation S308, with the second adjustment values being for re-adjusting the coefficients of the 2-dimensionally transformed image. For example, if the set transformation technique is the H.264 transformation technique, coefficients of the 2-dimensionally transformed image may be adjusted using a second adjustment value corresponding to the H.264 transformation technique.

In particular, the enhancement transformation result obtained in operation S306 may be reflected on the coefficients of the 2-dimensionally transformed image and the coefficients of the 2-dimensionally transformed image may be adjusted using a second adjustment value corresponding to the set transformation technique, in operation S308.

FIG. 5 further illustrates an inverse transforming method used for a multi-codec, according to an embodiment of the present invention.

In operation S400, a coded image may be 1-dimensionally inverse transformed using a 1-dimensional IDCT matrix of 1-dimensional IDCT matrixes corresponding to an inverse transformation technique of the coded image, with the 1-dimensional IDCT matrixes corresponding to respective inverse transformation techniques.

Here, in one embodiment, the 1-dimensional IDCT matrixes are matrixes corresponding to MPEG, H.264, and VC-1 inverse transformation techniques.

In operation S400, the coded image may be 1-dimensionally inverse transformed in the unit of 8×8 block size, for example.

If the inverse transformation technique of the coded image is the MPEG inverse transformation technique, a coded image of 8×8 block size may be 1-dimensionally inverse transformed using an 8×8 1-dimensional IDCT matrix corresponding to the MPEG inverse transformation technique, in operation S400.

If the inverse transformation technique is the H.264 inverse transformation technique, an image of 4×4 block size may be 1-dimensionally inverse transformed using Equation 9, in operation S400, such that four images of 4×4 block size are 1-dimensionally inverse transformed at the same time, for example.

If the inverse transformation technique of the coded image is the VC-1 inverse transformation technique, the coded image may be 1-dimensionally inverse transformed using a combination of 1-dimensional IDCT matrixes corresponding to the VC-1 inverse transformation technique, in operation S400.

Here, an image of 4×4 block size may be 1-dimensionally inverse transformed using Equation 10, in operation S400, such that four images of 4×4 block size are 1-dimensionally inverse transformed at the same time, for example.

Similarly, an image of 4×8 block size may be 1-dimensionally inverse transformed using Equation 11, in operation S400, such that two images of 4×8 block size are 1-dimensionally inverse transformed at the same time, for example.

Further, an image of 8×4 block size may likewise be 1-dimensionally inverse transformed using Equation, 12 in operation S400, such that two images of 8×4 block size are 1-dimensionally inverse transformed at the same time, for example.

After S400, coefficients of the 1-dimensionally inverse transformed image may be adjusted using a third adjustment value of third adjustment values corresponding to the inverse transformation technique of the coded image, in operation S402, with the third adjustment values being for re-adjusting the coefficients of the 1-dimensionally inverse transformed image. For example, if the set inverse transformation technique is the H.264 inverse transformation technique, the coefficients of the 1-dimensionally inverse transformed image may be adjusted using a third adjustment value corresponding to the H.264 inverse transformation technique.

After S402, the 1-dimensionally inverse transformed image may be 2-dimensionally inverse transformed using a 2-dimensional IDCT matrix of 2-dimensional IDCT matrixes corresponding to the inverse transformation technique of the coded image, in operation S404, with the 2-dimensional IDCT matrixes corresponding to the respective inverse transformation techniques.

Here, in one embodiment, the 2-dimensional IDCT matrixes may be matrixes corresponding to the MPEG, H.264, and VC-1 inverse transformation techniques.

If the inverse transformation technique of the coded image is the MPEG inverse transformation technique, the 1-dimensionally inverse transformed image may be 2-dimensionally inverse transformed using an 8×8 2-dimensional IDCT matrix corresponding to the MPEG inverse transformation technique, in operation S404.

If the inverse transformation technique of the coded image is the H.264 inverse transformation technique, the 1-dimensionally transformed image may be 2-dimensionally inverse transformed using a combination of 4×4 2-dimensional IDCT matrixes corresponding to the H.264 inverse transformation technique, in operation S404. Here, in operation S404, the 1-dimensionally inverse transformed image may be 2-dimensionally inverse transformed using Equation 13.

If the inverse transformation technique of the coded image is the VC-1 inverse transformation technique, the 1-dimensionally inverse transformed image may be 2-dimensionally inverse transformed using a combination of 2-dimensional IDCT matrixes corresponding to the VC-1 inverse transformation technique, in operation S404.

Here, the image 1-dimensionally inverse transformed by Equation 10 may be 2-dimensionally inverse transformed using Equation 14, in operation S404.

Similarly, the image 1-dimensionally inverse transformed by Equation 11 may be 2-dimensionally inverse transformed using Equation 15, in operation S404.

Further, the image 1-dimensionally inverse transformed by Equation 12 may be 2-dimensionally transformed using Equation 16, in operation S404.

After operation S402, in operation S406, the 1-dimensionally inverse transformed image may be enhancement inverse transformed to improve efficiency of integer inverse transformation, for example. The enhancement inverse transformation means correction inverse transformation of a coefficient of an image adjusted in operation S404.

After operations S404 and S406, coefficients of the 2-dimensionally inverse transformed image may also be adjusted using a fourth adjustment value of fourth adjustment values corresponding to the inverse transformation technique of the coded image, in operation S408, with the fourth adjustment values being for re-adjusting the coefficients of the 2-dimensionally inverse transformed image. For example, if the inverse transformation technique of the coded image is the H.264 inverse transformation technique, the coefficients of the 2-dimensionally inverse transformed image may be adjusted using a fourth adjustment value corresponding to the H.264 inverse transformation technique.

In particular, the enhancement inverse transformation result obtained in operation S406 may be reflected on the coefficients of the 2-dimensionally inverse transformed image and the coefficients of the 2-dimensionally inverse transformed image may be adjusted using a fourth adjustment value corresponding to the inverse transformation technique of the coded image, in operation S408.

As described above, in a transforming system, medium, and method for a multi-codec according to embodiments of the present invention, an image can be coded or decoded using various transformation techniques, such as MPEG, H.264, and VC-1 transformation techniques, for example.

Further, the required volumes of the transformation and inverse transformation systems can be reduced to reduce a space occupied by such a multi-codec.

In addition, the transformation and inverse transformation systems can be simplified over conventional separate systems to reduce a design period for the multi-codec and easily improve the multi-codec.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), for example.

The media may also be a distributed network, so that the computer readable code is stored/transferred and executed in a distributed fashion. Still further, as only a example, the processing element could include a processor or a computer processor, and processing elements may be distributed and/or included in a single device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A multi-codec transforming system for a multi-codec corresponding to a plurality of different codec transformation techniques, comprising:
   a first matrix storage to store a plurality of 1-dimensional DCT (discrete cosine transform) matrixes corresponding to respective transformation techniques, of the plurality of different codec transformation techniques;
   a second matrix storage to store a plurality of 2-dimensional DCT matrixes corresponding to the respective transformation techniques; and
   a processor comprising a 1-dimensional transformer, a 2-dimensional transformer, and an enhancement transformer,
   wherein, the 1-dimensional transformer to 1-dimensionally transform an input image using a 1-dimensional DCT matrix corresponding to a set transformation technique, selected from among the plurality of 1-dimensional DCT matrixes;
   the 2-dimensional transformer to 2-dimensionally transform the 1-dimensionally transformed image using a 2-dimensional DCT matrix corresponding to the set transformation technique, selected from among the plurality of 2-dimensional DCT matrixes; and
   the enhancement transformer to enhancement transform the 1-dimensionally transformed image to improve efficiency of integer transformation.

2. The transforming system of claim 1, wherein the second matrix storage stores at least 2-dimensional matrixes corresponding to MPEG, H.264, and VC-1 transformation techniques as the plurality of 2-dimensional DCT matrixes.

3. The transforming system of claim 1, further comprising:
a first adjustment value storage to store first adjustment values corresponding to the respective transformation techniques to re-adjust coefficients of the 1-dimensionally transformed image,
wherein the processor further comprises a first coefficient value adjuster to adjust the coefficients of the 1-dimensionally transformed image using a first adjustment value corresponding to the set transformation technique.

4. The transforming system of claim 1, further comprising:
a second adjustment value storage to store second adjustment values corresponding to the respective transformation techniques to re-adjust coefficients of the 2-dimensionally transformed image,
wherein the processor further comprises a second coefficient value adjuster to adjust the coefficients of the 2-dimensionally transformed image using a second adjustment value corresponding to the set transformation technique.

5. The transforming system of claim 1, wherein the first matrix storage stores at least 1-dimensional DCT matrixes corresponding to MPEG (moving picture experts group), H.264, and VC-1 (VC-1 compressed video bitstream format and decoding process) transformation techniques as the plurality of 1-dimensional DCT matrixes.

6. The transforming system of claim 5, wherein the 1-dimensional transformer 1-dimensionally transforms the input image in units of 8×8 block sizes.

7. The transforming system of claim 6, wherein if the set transformation technique is the H.264 transformation technique, the 1-dimensional transformer 1-dimensionally transforms an image of 4×4 block size based on:

$$D_1 = P_{HS} \times T_{HS},$$

where $D_1$ denotes a matrix of a 1-dimensionally transformed image, $P_{HS}$ denotes a matrix $$P_{HS} = \begin{bmatrix} P_{H1} & P_{H2} \\ P_{H3} & P_{H4} \end{bmatrix}$$

of a new input image formed of combinations of input images $P_{H1}$, $P_{H2}$, $P_{H3}$, and $P_{H4}$ each having a 4×4 block size, and $T_{HS}$ denotes a new 8×8 1-dimensional DCT matrix $$T_{HS} = \begin{bmatrix} T_{H1} & 0 \\ 0 & T_{H1} \end{bmatrix}$$

formed of combinations of a 1-dimensional DCT matrix $T_{H1}$ corresponding to the H.264 transformation technique.

8. The transforming system of claim 7, wherein the 2-dimensional transformer 2-dimensionally transforms the 1-dimensionally transformed image based on:

$$D_2 = D_1^T \times T_{HS},$$

where $D_2$ denotes a matrix of a 2-dimensionally transformed image, and $D_1^T$ denotes a transposed matrix of $D_1$.

9. The transforming system of claim 6, wherein if the set transformation technique is the VC-1 transformation technique, the 1-dimensional transformer 1-dimensionally transforms an image of 4×4 block size based on:

$$D_1 = P_{VS1} \times T_{VS1},$$

where $D_1$ denotes a matrix of a 1-dimensionally transformed image, $P_{VS1}$ denotes a matrix o $$P_{VS1} = \begin{bmatrix} P_{V1} & P_{V2} \\ P_{V3} & P_{V4} \end{bmatrix}$$

of a new input image formed of combinations of images $P_{V1}$, $P_{V2}$, $P_{V3}$, and $P_{V4}$ of 4×4 block size, and $T_{VS1}$ denotes a new 8×8 1-dimensional DCT matrix $$T_{VS1} = \begin{bmatrix} T_{V1} & 0 \\ 0 & T_{V1} \end{bmatrix}$$

formed of combinations of a 4×4 1-dimensional DCT matrix $T_{V1}$ corresponding to the VC-1 transformation technique.

10. The transforming system of claim 9, wherein the 2-dimensional transformer 2-dimensionally transforms the 1-dimensionally transformed image based on:

$$D_2 = D_1^T \times T_{VS4},$$

where $D_2$ denotes a matrix of a 2-dimensionally transformed image, $D_1^T$ denotes a transposed matrix of $D_1$, and $T_{VS4}$ denotes a new 8×8 2-dimensional DCT matrix $$T_{VS4} = \begin{bmatrix} T_{V3} & 0 \\ 0 & T_{V3} \end{bmatrix}$$

formed of a combination of a 4×4 2-dimensional DCT matrix $T_{V3}$ corresponding to the VC-1 transformation technique.

11. The transforming system of claim 6, wherein if the set transformation technique is the VC-1 transformation technique, the 1-dimensional transformer 1-dimensionally transforms an image of 4×8 block size based on:

$$D_1 = P_{VS2} \times T_{VS2},$$

where $D_1$ denotes a matrix of a 1-dimensionally transformed image, $P_{VS2}$ denotes a matrix $$P_{VS2} = \begin{bmatrix} P_{V5} \\ P_{V6} \end{bmatrix}$$

of a new input image formed of a combination of input images $P_{V5}$ and $P_{V6}$ of 4×8 block size, and $T_{VS2}$ denotes a 8×8 1-dimensional DCT matrix corresponding to the VC-1 transformation technique.

12. The transforming system of claim 11, wherein the 2-dimensional transformer 2-dimensionally transforms the 1-dimensionally transformed image based on:

$$D_2 = D_1^T \times T_{VS5},$$

where $D_2$ denotes a matrix of a 2-dimensionally transformed image, $D_1^T$ denotes a transposed matrix of $D_1$, and $T_{VS5}$ denotes a new 2-dimensional DCT matrix $$T_{VS5} = \begin{bmatrix} T_{V4} & 0 \\ 0 & T_{V4} \end{bmatrix}$$

formed of a combination of a 2-dimensional DCT matrix $T_{V4}$ of 4×4 block size corresponding to the VC-1 transformation technique.

13. The transforming system of claim 6, wherein if the set transformation technique is the VC-1 transformation technique, the 1-dimensional transformer 1-dimensionally transforms an image of 8×4 block size based on:

$$D_1 = P_{VS3} \times T_{VS3},$$

where $D_1$ denotes a matrix of a 1-dimensionally transformed image, $P_{VS3}$ denotes a matrix $P_{VS3} = [P_{V7}\ P_{V8}]$ of a new input image formed of a combination of images $P_{V7}$ and $P_{V8}$ of 8×4 block size, and $T_{VS3}$ denotes a new 1-dimensional DCT matrix $$T_{VS3} = \begin{bmatrix} T_{V2} & 0 \\ 0 & T_{V2} \end{bmatrix}$$

formed of a combination of a 1-dimensional DCT matrix $T_{V2}$ of 4×4 block size corresponding to the VC-1 transformation technique.

14. The transforming system of claim 13, wherein the 2-dimensional transformer 2-dimensionally transforms the 1-dimensionally transformed image based on:

$$D_2 = D_1^T \times T_{VS6},$$

where $D_2$ denotes a matrix of a 2-dimensionally transformed image, $D_1^T$ denotes a transposed matrix of $D_1$, and $T_{VS6}$ denotes a 2-dimensional DCT matrix of 8×8 block size corresponding to the VC-1 transformation technique.

15. A multi-codec inverse transforming system for a multi-codec corresponding to a plurality of different codec transformation techniques, comprising:
a first matrix storage to store 1-dimensional IDCT (inverse discrete cosine transform) matrixes corresponding to respective inverse transformation techniques, of the plurality of different codec transformation techniques;
a second matrix storage to store 2-dimensional IDCT matrixes corresponding to the respective inverse transformation techniques; and
a processor comprising a 1-dimensional inverse transformer, a 2-dimensional inverse transformer and an enhancement inverse transformer,
wherein, the 1-dimensional inverse transformer to 1-dimensionally inverse transform a coded image using a 1-dimensional IDCT matrix corresponding to an inverse transformation technique of the coded image, selected from among the plurality of 1-dimensional DCT matrixes;
the 2-dimensional inverse transformer to 2-dimensionally inverse transform the 1-dimensionally inverse transformed image using a 2-dimensional IDCT matrix corresponding to the inverse transformation technique of the coded image, selected from among the plurality of 2-dimensional DCT matrixes; and
the enhancement inverse transformer to enhancement inverse transform the 1-dimensionally inverse transformed image to improve efficiency of integer inverse transformation.

16. The inverse transforming system of claim 15, wherein the second matrix storage stores at least 2-dimensional IDCT matrixes corresponding to MPEG, H.264, and VC-1 inverse transformation techniques as the plurality of 2-dimensional IDCT matrixes.

17. The inverse transforming system of claim 15, further comprising:
a first adjustment value storage to store first adjustment values corresponding to the respective inverse transformation techniques to re-adjust coefficients of the 1-dimensionally inverse transformed image,
wherein the processor further comprises a first coefficient value adjuster to adjust the coefficients of the 1-dimensionally inverse transformed image using a first adjustment value corresponding to the inverse transformation technique of the coded image.

18. The inverse transforming system of claim 15, further comprising:
a second adjustment value storage to store second adjustment values corresponding to the respective inverse transformation techniques to re-adjust coefficients of the 2-dimensionally inverse transformed image,
wherein the processor further comprises a second coefficient value adjuster to adjust the coefficients of the 2-dimensionally inverse transformed image using a second adjustment value corresponding to the inverse transformation technique of the coded image.

19. The inverse transforming system of claim 15, wherein the first matrix storage stores at least 1-dimensional IDCT matrixes corresponding to MPEG, H.264, and VC-1 inverse transformation techniques as the plurality of 1-dimensional IDCT matrixes.

20. The inverse transforming system of claim 19, wherein the 1-dimensional inverse transformer 1-dimensionally inverse transforms the coded image in units of 8×8 block sizes.

21. The inverse transforming system of claim 20, wherein if the inverse transformation technique of the coded image is the H.264 inverse transformation technique, the 1-dimensional inverse transformer 1-dimensionally inverse transforms an image of 4×4 block size based on:

$$D_{I1} = P_{IHS} \times T_{IHS},$$

where $D_{I1}$ denotes a matrix of a 1-dimensionally inverse transformed image, $P_{IHS}$ denotes a matrix $$P_{IHS} = \begin{bmatrix} P_{IH1} & P_{IH2} \\ P_{IH3} & P_{IH4} \end{bmatrix}$$

of a new coded image formed of a combination of coded images $P_{IH1}$, $P_{IH2}$, $P_{IH3}$, and $P_{IH4}$ of 4×4 block size, and $T_{IHS}$ denotes a new 8×8 1-dimensional IDCT matrix $$T_{IHS} = \begin{bmatrix} T_{IH1} & 0 \\ 0 & T_{IH1} \end{bmatrix}$$

formed of a combination of a 4×4 1-dimensional IDCT matrix $T_{IH1}$ corresponding to the H.264 inverse transformation technique.

22. The inverse transforming system of claim 21, wherein the 2-dimensional inverse transformer 2-dimensionally inverse transforms the 1-dimensionally inverse transformed image based on:

$$D_{I2} = D_{I1}^T \times T_{IHS},$$

where $D_{I2}$ denotes a matrix of a 2-dimensionally inverse transformed image, and $D_{I1}^T$ denotes a transposed matrix of $D_{I1}$.

23. The inverse transforming system of claim 20, wherein if the inverse transformation technique of the coded image is the VC-1 inverse transformation technique, the 1-dimensional inverse transformer 1-dimensionally inverse transforms an image of 4×4 block size based on:

$$D_{f1}=P_{IVS1}\times T_{IVS1},$$

where $D_{f1}$ denotes a matrix of a 1-dimensionally inverse transformed image, $P_{IVS1}$ denotes a matrix $$P_{IVS1} = \begin{bmatrix} P_{IV1} & P_{IV2} \\ P_{IV3} & P_{IV4} \end{bmatrix}$$

of a new coded image formed of a combination of coded images $P_{IV1}$, $P_{IV2}$, $P_{IV3}$, and $P_{IV4}$ of 4×4 block size, and $T_{IVS1}$ denotes a new 8×8 1-dimensional IDCT matrix $$T_{IVS1} = \begin{bmatrix} T_{IV1} & 0 \\ 0 & T_{IV1} \end{bmatrix}$$

formed of a combination of a 1-dimensional IDCT matrix $T_{IV1}$ corresponding to the VC-1 inverse transformation technique.

24. The inverse transforming system of claim 23, wherein the 2-dimensional inverse transformer 2-dimensionally inverse transforms the 1-dimensionally inverse transformed image based on:

$$D_{f2}=D_{f1}\times T_{IVS4},$$

where $D_{f2}$ denotes a matrix of a 2-dimensionally inverse transformed image, $D_{f1}{}^T$ denotes a transposed matrix of $D_{f1}$, and $T_{IVS4}$ denotes a new 8×8 2-dimensional IDCT matrix $$T_{IVS4} = \begin{bmatrix} T_{IV3} & 0 \\ 0 & T_{IV3} \end{bmatrix}$$

formed of a combination of a 4×4 2-dimensional IDCT matrix $T_{IV3}$ corresponding to the VC-1 inverse transformation technique.

25. The inverse transforming system of claim 20, wherein if the inverse transformation technique of the coded image is the VC-1 inverse transformation technique, the 1-dimensional inverse transformer 1-dimensionally inverse transforms an image of 4×8 block size based on:

$$D_{f1}=P_{IVS2}\times T_{IVS2},$$

where $D_{f1}$ denotes a matrix of a 1-dimensionally inverse transformed image, $P_{IVS2}$ denotes a matrix $$P_{IVS2} = \begin{bmatrix} P_{IV5} \\ P_{IV6} \end{bmatrix}$$

of a new coded image formed of a combination of coded images $P_{IV5}$ and $P_{IV6}$ of 4×8 block size, and $T_{IVS2}$ denotes an 8×8 1-dimensional IDCT matrix corresponding to the VC-1 inverse transformation technique.

26. The inverse transforming system of claim 25, wherein the 2-dimensional inverse transformer 2-dimensionally inverse transforms the 1-dimensionally inverse transforms based on:

$$D_{f2}=D_{f1}{}^T\times T_{IVS5},$$

where $D_{f2}$ denotes a matrix of a 2-dimensionally inverse transformed image, $D_{f1}{}^T$ denotes a transposed matrix of $D_{f1}$, and $T_{IVS5}$ denotes a new 2-dimensional IDCT matrix $$T_{IVS5} = \begin{bmatrix} T_{IV4} & 0 \\ 0 & T_{IV4} \end{bmatrix}$$

formed of a combination of a 2-dimensional IDCT matrix $T_{IV4}$ of 4×4 block size corresponding to the VC-1 inverse transformation technique.

27. The inverse transforming system of claim 20, wherein if the inverse transformation technique of the coded image is the VC-1 inverse transformation technique, the 1-dimensional inverse transformer 1-dimensionally inverse transforms an image of 8×4 block size based on:

$$D_{f1}=P_{IVS3}\times T_{IVS3},$$

where $D_{f1}$ denotes a matrix of a 1-dimensionally inverse transformed image, $P_{IVS3}$ denotes a matrix $P_{IV3}=[P_{IV7}\ P_{IV8}]$ of a new coded image formed of a combination of coded images $P_{IV7}$ and $P_{IV8}$ of 8×4 block size, and $T_{IVS3}$ denotes a new 1-dimensional IDCT matrix $$T_{IV3} = \begin{bmatrix} T_{IV2} & 0 \\ 0 & T_{IV2} \end{bmatrix}$$

formed of a 1-dimensional IDCT matrix $T_{IV2}$ of 4×4 block size corresponding to the VC-1 inverse transformation technique.

28. The inverse transforming system of claim 27, wherein the 2-dimensional inverse transformer 2-dimensionally inverse transforms the 1-dimensionally inverse transformed image based on:

$$D_{f2}=D_{f1}{}^T\times T_{IVS6},$$

where $D_{f2}$ denotes a matrix of the 2-dimensionally transformed image, $D_{f1}{}^T$ denotes a transposed matrix of $D_{f1}$, and $T_{IVS6}$ denotes a 2-dimensional IDCT matrix of 8×8 block size corresponding to the VC-1 inverse transformation technique.

29. A multi-codec transforming method for a multi-codec corresponding to a plurality of different codec transformation techniques, comprising:

1-dimensionally transforming an input image using a 1-dimensional DCT matrix corresponding to a set transformation technique, of the plurality of different codec transformation techniques, selected from among a plurality of 1-dimensional DCT matrixes corresponding to respective transformation techniques;

2-dimensionally transforming the 1-dimensionally transformed image using a 2-dimensional DCT matrix corresponding to the set transformation technique, selected from among a plurality of 2-dimensional DCT matrixes corresponding to the respective transformation techniques; and using at least one processing device enhancement transforming the 1-dimensionally transformed image to improve efficiency of integer transformation.

30. The transforming method of claim 29, wherein the plurality of 2-dimensional DCT matrixes comprise at least 2-dimensional DCT matrixes corresponding to MPEG, H.264, and VC-1 transformation techniques.

31. The transforming method of claim 29, further comprising adjusting coefficients of the 1-dimensionally transformed image using a first adjustment value corresponding to the set transformation technique, selected from among first adjustment values for re-adjusting the coefficients of the 1-dimensionally transformed image.

32. The transforming method of claim 29, further comprising adjusting coefficients of the 2-dimensionally transformed image using a second adjustment value corresponding to the set transformation technique, selected from among second adjustment values for re-adjusting the coefficients of the 2-dimensionally transformed image.

33. The transforming method of claim 29, wherein the plurality of 1-dimensional DCT matrixes comprise at least 1-dimensional DCT matrixes corresponding to MPEG, H.264, and VC-1 transformation techniques.

34. The transforming method of claim 33, wherein the input image is 1-dimensionally transformed in units of 8×8 block sizes.

35. The transforming method of claim 34, wherein if the set transformation technique is the H.264 transformation technique, an image of 4×4 block size is 1-dimensionally transformed based on:

$$D_1 = P_{HS} \times T_{HS},$$

where $D_1$ denotes a matrix of a 1-dimensionally transformed image, $P_{HS}$ denotes a matrix $$P_{HS} = \begin{bmatrix} P_{H1} & P_{H2} \\ P_{H3} & P_{H4} \end{bmatrix}$$

of a new input image formed of combinations of input images $P_{H1}$, $P_{H2}$, $P_{H3}$, and $P_{H4}$ each having a 4×4 block size, and $T_{HS}$ denotes a new 8×8 1-dimensional DCT matrix $$T_{HS} = \begin{bmatrix} T_{H1} & 0 \\ 0 & T_{H1} \end{bmatrix}$$

formed of combinations of a 1-dimensional DCT matrix $T_{H1}$ corresponding to the H.264 transformation technique.

36. The transforming method of claim 35, wherein the 1-dimensionally transformed image is 2-dimensionally transformed based on:

$$D_2 = D_1^T \times T_{HS},$$

where $D_2$ denotes a matrix of a 2-dimensionally transformed image and $D_1^T$ denotes a transposed matrix of $D_1$.

37. The transforming method of claim 34, wherein if the set transformation technique is the VC-1 transformation technique, an image of 4×4 block size is 1-dimensionally transformed based on:

$$D_1 = P_{VS1} \times T_{VS1},$$

where $D_1$ denotes a matrix of a 1-dimensionally transformed image, $P_{VS1}$ denotes a matrix o $$P_{VS1} = \begin{bmatrix} P_{V1} & P_{V2} \\ P_{V3} & P_{V4} \end{bmatrix}$$

of a new input image formed of combinations of images $P_{V1}$, $P_{V2}$, $P_{V3}$, and $P_{V4}$ of 4×4 block size, and $T_{VS1}$ denotes a new 8×8 1-dimensional DCT matrix $$T_{VS1} = \begin{bmatrix} T_{V1} & 0 \\ 0 & T_{V1} \end{bmatrix}$$

formed of combinations of a 4×4 1-dimensional DCT matrix $T_{V1}$ corresponding to the VC-1 transformation technique.

38. The transforming method of claim 37, wherein the 1-dimensionally transformed image is 2-dimensionally transformed based on:

$$D_2 = D_1^T \times T_{VS4},$$

where $D_2$ denotes a matrix of a 2-dimensionally transformed image, $D_1^T$ denotes a transposed matrix of $D_1$, and $T_{VS4}$ denotes a new 8×8 2-dimensional DCT matrix $$T_{VS4} = \begin{bmatrix} T_{V3} & 0 \\ 0 & T_{V3} \end{bmatrix}$$

formed of a combination of a 4×4 2-dimensional DCT matrix $T_{V3}$ corresponding to the VC-1 transformation technique.

39. The transforming method of claim 34, wherein if the set transformation technique is the VC-1 transformation technique, an image of 4×8 block size is 1-dimensionally transformed based on:

$$D_1 = P_{VS2} \times T_{VS2},$$

where $D_1$ denotes a matrix of a 1-dimensionally transformed image, $P_{VS2}$ denotes a matrix $$P_{VS2} = \begin{bmatrix} P_{V5} \\ P_{V6} \end{bmatrix}$$

of a new input image formed of a combination of input images $P_{V5}$ and $P_{V6}$ of 4×8 block size, and $T_{VS2}$ denotes a 8×8 1-dimensional DCT matrix corresponding to the VC-1 transformation technique.

40. The transforming method of claim 39, wherein the 1-dimensionally transformed image is 2-dimensionally transformed based on:

$$D_2 = D_1^T \times T_{VS5},$$

where $D_2$ denotes a matrix of the 2-dimensionally transformed image, $D_1^T$ denotes a transposed matrix of $D_1$, and $T_{VS5}$ denotes a new 2-dimensional DCT matrix $$T_{VS5} = \begin{bmatrix} T_{V4} & 0 \\ 0 & T_{V4} \end{bmatrix}$$

formed of a combination of a 2-dimensional DCT matrix $T_{V4}$ of 4×4 block size corresponding to the VC-1 transformation technique.

41. The transforming method of claim 34, wherein if the set transformation technique is the VC-1 transformation technique, an image of 8×4 block size is 1-dimensionally transformed based on:

$$D_1 = P_{VS3} \times T_{VS3},$$

where $D_1$ denotes a matrix of a 1-dimensionally transformed image, $P_{VS3}$ denotes a matrix $P_{VS3} = [P_{V7}\ P_{V8}]$ of a new input image formed of a combination of images $P_{V7}$ and $P_{V8}$ of 8×4 block size, and $T_{VS3}$ denotes a new 1-dimensional DCT matrix $$T_{VS3} = \begin{bmatrix} T_{V2} & 0 \\ 0 & T_{V2} \end{bmatrix}$$

formed of a combination of a 1-dimensional DCT matrix $T_{V2}$ of 4×4 block size corresponding to the VC-1 transformation technique.

42. The transforming method of claim 41, wherein the 1-dimensionally transformed image is 2-dimensionally transformed based on:

$$D_2 = D_1^T \times T_{VS6},$$

where $D_2$ denotes a matrix of the 2-dimensionally transformed image, $D_1^T$ denotes a transposed matrix of $D_1$, and $T_{VS6}$ denotes a 2-dimensional DCT matrix of 8×8 block size corresponding to the VC-1 transformation technique.

43. A multi-codec inverse transforming method for a multi-codec corresponding to a plurality of different codec transformation techniques, comprising:

1-dimensionally inverse transforming a coded image using a 1-dimensional IDCT matrix corresponding to an inverse transformation technique of the coded image, selected from among a plurality of 1-dimensional IDCT matrixes corresponding to respective inverse transformation techniques;

2-dimensionally inverse transforming the 1-dimensionally inverse transformed image using a 2-dimensional IDCT matrix corresponding to the inverse transformation technique of the coded image, selected from among a plurality of 2-dimensional IDCT matrixes corresponding to the respective inverse transformation techniques; and using at least one processing device enhancement inverse transforming the 1-dimensionally inverse transformed image to improve efficiency of integer inverse transformation.

44. The inverse transforming method of claim 43, wherein the plurality of 2-dimensional IDCT matrixes comprise at least 2-dimensional IDCT matrixes corresponding to MPEG, H.264, and VC-1 inverse transformation techniques.

45. The inverse transforming method of claim 43, further comprising adjusting coefficients of the 1-dimensionally transformed image using a first adjustment value corresponding to the inverse transformation technique of the coded image, selected from among first adjustment values for re-adjusting the coefficients of the 1-dimensionally transformed image.

46. The inverse transforming method of claim 43, further comprising adjusting coefficients of the 2-dimensionally inverse transformed image using a second adjustment value corresponding to the inverse transformation technique of the coded image, selected from among second adjustment values for adjusting the coefficients of the 2-dimensionally inverse transformed image.

47. The inverse transforming method of claim 43, wherein the plurality of 1-dimensional IDCT matrixes comprise at least 1-dimensional IDCT matrixes corresponding to MPEG, H.264, and VC-1 inverse transformation techniques.

48. The inverse transforming method of claim 47, wherein the coded image is 1-dimensionally inverse transformed in units of 8×8 block sizes.

49. The inverse transforming method of claim 48, wherein if the inverse transformation technique of the coded image is the H.264 inverse transformation technique, an image of 4×4 block size is 1-dimensionally inverse transformed based on:

$$D_{I1} = P_{IHS} \times T_{IHS},$$

where $D_{I1}$ denotes a matrix of a 1-dimensionally inverse transformed image, $P_{IHS}$ denotes a matrix $$P_{IHS} = \begin{bmatrix} P_{IH1} & P_{IH2} \\ P_{IH3} & P_{IH4} \end{bmatrix}$$

of a new coded image formed of a combination of coded images $P_{IH1}$, $P_{IH2}$, $P_{IH3}$, and $P_{IH4}$ of 4×4 block size, and $T_{IHS}$ denotes a new 8×8 1-dimensional IDCT matrix $$T_{IHS} = \begin{bmatrix} T_{IH1} & 0 \\ 0 & T_{IH1} \end{bmatrix}$$

formed of a combination of a 4×4 1-dimensional IDCT matrix $T_{IH1}$ corresponding to the H.264 inverse transformation technique.

50. The inverse transforming method of claim 49, wherein the 1-dimensionally inverse transformed image is 2-dimensionally inverse transformed based on:

$$D_{I2} = D_{I1}^T \times T_{IHS},$$

where $D_{I2}$ denotes a matrix of a 2-dimensionally inverse transformed image, and $D_{I1}^T$ denotes a transposed matrix of $D_{I1}$.

51. The inverse transforming method of claim 48, wherein if the inverse transformation technique of the coded image is the VC-1 inverse transformation technique, an image of 4×4 block size is 1-dimensionally inverse transformed based on:

$$D_{I1} = P_{IVS1} \times T_{IVS1},$$

where $D_{I1}$ denotes a matrix of a 1-dimensionally inverse transformed image, $P_{IVS1}$ denotes a matrix $$P_{IVS1} = \begin{bmatrix} P_{IV1} & P_{IV2} \\ P_{IV3} & P_{IV4} \end{bmatrix}$$

of a new coded image formed of a combination of coded images $P_{IV1}$, $P_{IV2}$, $P_{IV3}$, and $P_{IV4}$ of 4×4 block size, and $T_{IVS1}$ denotes a new 8×8 1-dimensional IDCT matrix $$T_{IVS1} = \begin{bmatrix} T_{IV1} & 0 \\ 0 & T_{IV1} \end{bmatrix}$$

formed of a combination of a 1-dimensional IDCT matrix $T_{IV1}$ corresponding to the VC-1 inverse transformation technique.

52. The inverse transforming method of claim 51, wherein the 1-dimensionally inverse transformed image is 2-dimensionally inverse transformed based on:

$$D_{I2} = D_{I1}^T \times T_{IVS4},$$

where $D_{I2}$ denotes a matrix of a 2-dimensionally inverse transformed image, $D_{i1}^T$ denotes a transposed matrix of $D_{I1}$, and $T_{IVS4}$ denotes a new 8×8 2-dimensional IDCT matrix $$T_{IVS4} = \begin{bmatrix} T_{IV3} & 0 \\ 0 & T_{IV3} \end{bmatrix}$$

formed of a combination of a 4×4 2-dimensional IDCT matrix $T_{IV3}$ corresponding to the VC-1 inverse transformation technique.

53. The inverse transforming method of claim 48, wherein if the inverse transformation technique of the coded image is the VC-1 inverse transformation technique, an image of 4×8 block size is 1-dimensionally inverse transformed based on:

$$D_{I1} = P_{IVS2} \times T_{IVS2},$$

where $D_{I1}$ denotes a matrix of a 1-dimensionally inverse transformed image, $P_{IVS2}$ denotes a matrix $$P_{IVS2} = \begin{bmatrix} P_{IV5} \\ P_{IV6} \end{bmatrix}$$

of a new coded image formed of a combination of coded images $P_{IV5}$ and $P_{IV6}$ of 4×8 block size, and $T_{IVS2}$ denotes an 8×8 1-dimensional IDCT matrix corresponding to the VC-1 inverse transformation technique.

54. The inverse transforming method of claim 53, wherein the 1-dimensionally inverse transformed image is 2-dimensionally inverse transformed based on:

$$D_{I2}=D_{I1}{}^T \times T_{IVS5},$$

where $D_{I2}$ denotes a matrix of a 2-dimensionally inverse transformed image, $D_{I1}{}^T$ denotes a transposed matrix of $D_{I1}$, and $T_{IVS5}$ denotes a new 2-dimensional IDCT matrix $$T_{IVS5} = \begin{bmatrix} T_{IV4} & 0 \\ 0 & T_{IV4} \end{bmatrix}$$

formed of a combination of a 2-dimensional IDCT matrix $T_{IV4}$ of 4×4 block size corresponding to the VC-1 inverse transformation technique.

55. The inverse transforming method of claim 48, wherein if the inverse transformation technique of the coded image is the VC-1 inverse transformation technique, an image of 8×4 block size is 1-dimensionally inverse transformed based on:

$$D_{I1}=P_{IVS3} \times T_{IVS3},$$

where $D_{I1}$ denotes a matrix of a 1-dimensionally inverse transformed image, $P_{IVS3}$ denotes a matrix $P_{IVS3}=[P_{IV7}\ P_{IV8}]$ of a new coded image formed of a combination of coded images $P_{IV7}$ and $P_{IV8}$ of 8×4 block size, and $T_{IVS3}$ denotes a new 1-dimensional IDCT matrix $$T_{IV3} = \begin{bmatrix} T_{IV2} & 0 \\ 0 & T_{IV2} \end{bmatrix}$$

formed of a 1-dimensional IDCT matrix $T_{IV2}$ of 4×4 block size corresponding to the VC-1 inverse transformation technique.

56. The inverse transforming method of claim 55, wherein the 1-dimensionally inverse transformed image is 2-dimensionally inverse transformed based on:

$$D_{I2}=D_{I1}{}^T \times T_{IVS6},$$

where $D_{I2}$ denotes a matrix of the 2-dimensionally transformed image, $D_{I1}{}^T$ denotes a transposed matrix of $D_{I1}$, and $T_{IVS6}$ denotes a 2-dimensional IDCT matrix of 8×8 block size corresponding to the VC-1 inverse transformation technique.

57. At least one medium comprising computer readable code to control at least one processing element to implement the method of claim 29.

58. At least one medium comprising computer readable code to control at least one processing element to implement the method of claim 43.

59. A multi-codec transforming system including at least one processing device for a multi-codec corresponding to a plurality of different codec transformation techniques, comprising:
   a first matrix storage to store a plurality of 1-dimensional DCT (discrete cosine transform) matrixes corresponding to respective transformation techniques, of the plurality of different codec transformation techniques;
   a second matrix storage to store a plurality of 2-dimensional DCT matrixes corresponding to the respective transformation techniques;
   a 1-dimensional transformer to 1-dimensionally transform an input image using a 1-dimensional DCT matrix corresponding to a set transformation technique, selected from among the plurality of 1-dimensional DCT matrixes;
   a 2-dimensional transformer to 2-dimensionally transform the 1-dimensionally transformed image using a 2-dimensional DCT matrix corresponding to the set transformation technique, selected from among the plurality of 2-dimensional DCT matrixes; and
   an enhancement transformer using the at least one processing device to enhancement transform the 1-dimensionally transformed image to improve efficiency of integer transformation.

60. A multi-codec inverse transforming system including at least one processing device for a multi-codec corresponding to a plurality of different codec transformation techniques, comprising:
   a first matrix storage to store 1-dimensional IDCT (inverse discrete cosine transform) matrixes corresponding to respective inverse transformation techniques, of the plurality of different codec transformation techniques;
   a second matrix storage to store 2-dimensional IDCT matrixes corresponding to the respective inverse transformation techniques; 1-dimensional inverse transformer to 1-dimensionally inverse transform a coded image using a 1-dimensional IDCT matrix corresponding to an inverse transformation technique of the coded image, selected from among the plurality of 1-dimensional DCT matrixes;
   a 2-dimensional inverse transformer to 2-dimensionally inverse transform the 1-dimensionally inverse transformed image using a 2-dimensional IDCT matrix corresponding to the inverse transformation technique of the coded image, selected from among the plurality of 2-dimensional DCT matrixes; and
   an enhancement inverse transformer using the at least one processing device to enhancement inverse transform the 1-dimensionally inverse transformed image to improve efficiency of integer inverse transformation.

* * * * *

UNITED STATES PATENT AND TRADEMARK OFFICE
CERTIFICATE OF CORRECTION

| | | |
|---|---|---|
| PATENT NO. | : 7,764,841 B2 | |
| APPLICATION NO. | : 11/516784 | |
| DATED | : July 27, 2010 | |
| INVENTOR(S) | : Shihwa Lee et al. | |

It is certified that error appears in the above-identified patent and that said Letters Patent is hereby corrected as shown below:

Column 24, Line 64 (Approx.) delete "D12=DI1XTIHS," and insert -- D12=DI1TXTIHS, --, therefor.

Column 25, Line 31 (Approx.) delete "D12=DI1XTIVS4," and insert -- DI2=DI1TXTIVS4, --, therefor.

Column 30, Line 51 delete "Di1T" and insert -- D11T --, therefor.

Column 32, Line 32-57 delete "A multi-codec inverse transforming system including at least one processing device for a multi-codec corresponding to a plurality of different codec transformation techniques, comprising:

a first matrix storage to store 1-dimensional IDCT (inverse discrete cosine transform) matrixes corresponding to respective inverse transformation techniques, of the plurality of different codec transformation techniques;

a second matrix storage to store 2-dimensional IDCT matrixes corresponding to the respective inverse transformation techniques; 1-dimensional inverse transformer to 1-dimensionally inverse transform a coded image using a 1-dimensional IDCT matrix corresponding to an inverse transformation technique of the coded image, selected from among the plurality of 1-dimensional DCT matrixes;

a 2-dimensional inverse transformer to 2-dimensionally inverse transform the 1-dimensionally inverse transformed image using a 2-dimensional IDCT matrix corresponding to the inverse transformation technique of the coded image, selected from among the plurality of 2-dimensional DCT matrixes;

and an enhancement inverse transformer using the at least one processing device to enhancement inverse transform the 1-dimensionally inverse transformed image to improve efficiency of integer inverse transformation."
and insert -- A multi-codec inverse transforming system including at least one processing device for a multi-codec corresponding to a plurality of different codec transformation techniques, comprising:

Signed and Sealed this
Seventh Day of February, 2012

David J. Kappos
*Director of the United States Patent and Trademark Office* a first matrix storage to store 1-dimensional IDCT (inverse discrete cosine transform) matrixes corresponding to respective inverse transformation techniques, of the plurality of different codec transformation techniques;

a second matrix storage to store 2-dimensional IDCT matrixes corresponding to the respective inverse transformation techniques;

1-dimensional inverse transformer to 1-dimensionally inverse transform a coded image using a 1-dimensional IDCT matrix corresponding to an inverse transformation technique of the coded image, selected from among the plurality of 1-dimensional DCT matrixes;

a 2-dimensional inverse transformer to 2-dimensionally inverse transform the 1-dimensionally inverse transformed image using a 2-dimensional IDCT matrix corresponding to the inverse transformation technique of the coded image, selected from among the plurality of 2-dimensional DCT matrixes;

and an enhancement inverse transformer using the at least one processing device to enhancement inverse transform the 1-dimensionally inverse transformed image to improve efficiency of integer inverse transformation. --, therefor.